United States Patent
Nakata

(10) Patent No.: US 10,412,552 B2
(45) Date of Patent: *Sep. 10, 2019

(54) MOBILE COMMUNICATION SYSTEM FOR SELECTING COMMUNICATION RESOURCE AND COMMUNICATION APPARATUS FOR SELECTING COMMUNICATION RESOURCE

(71) Applicant: DENSO CORPORATION, Kariya, Aichi-pref. (JP)

(72) Inventor: Tsuneo Nakata, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/161,905

(22) Filed: Oct. 16, 2018

(65) Prior Publication Data

US 2019/0053011 A1 Feb. 14, 2019

Related U.S. Application Data

(63) Continuation of application No. 15/419,839, filed on Jan. 30, 2017, now Pat. No. 10,136,263.

(30) Foreign Application Priority Data

Feb. 3, 2016 (JP) .................................. 2016-19254
Sep. 13, 2016 (JP) ................................. 2016-178771

(51) Int. Cl.
*H04W 4/029* (2018.01)
*H04L 25/02* (2006.01)
(Continued)

(52) U.S. Cl.
CPC ......... *H04W 4/029* (2018.02); *H04L 25/0204* (2013.01); *H04L 25/0224* (2013.01);
(Continued)

(58) Field of Classification Search
CPC ....... H04W 4/029; H04W 4/046; H04W 4/40; H04W 28/26; H04W 72/048; H04L 25/03292; H04L 25/0224; H04L 25/0204
(Continued)

(56) References Cited

U.S. PATENT DOCUMENTS

2002/0115465 A1* 8/2002 Komatsu ............. H04W 52/223
455/522
2006/0040697 A1 2/2006 Komatsu
(Continued)

FOREIGN PATENT DOCUMENTS

JP 2011-172160 9/2011
JP 2012-186545 9/2012

*Primary Examiner* — Michael Y Mapa
(74) *Attorney, Agent, or Firm* — Knobbe, Martens, Olson & Bear, LLP

(57) ABSTRACT

In a mobile communication system, a mobile communication apparatus in a vehicle includes a selected resource antenna permitting communication using a selected resource, establishing wireless communication with a target communication apparatus. The mobile communication system includes a propagation path characteristic acquirer section and a resource selector section. The propagation path characteristics acquirer section acquires propagation path characteristics information in association with a future communication position, the propagation path characteristics information being about propagation path characteristics between (i) the target communication apparatus and (ii) a reference antenna equal to the selected resource antenna in antenna characteristics including an antenna format. The resource selector section, based on the propagation path characteristics information, selects a resource to be used in communication at the future communication position before the selected resource antenna of the mobile communication apparatus comes to be placed at the future communication position.

28 Claims, 23 Drawing Sheets

(51) Int. Cl.
*H04W 4/40* (2018.01)
*H04W 72/04* (2009.01)
*H04L 25/03* (2006.01)
*H04W 28/26* (2009.01)
*H04W 4/04* (2009.01)

(52) U.S. Cl.
CPC ....... *H04L 25/03292* (2013.01); *H04W 4/046* (2013.01); *H04W 4/40* (2018.02); *H04W 72/048* (2013.01); *H04W 28/26* (2013.01)

(58) Field of Classification Search
USPC ....... 455/13.3, 25, 63.4, 404.2, 414.1–414.2, 455/418–420, 450–452.2, 456.1–457, 455/562.1, 575.7
See application file for complete search history.

(56) References Cited

U.S. PATENT DOCUMENTS

| | | | |
|---|---|---|---|
| 2007/0087695 A1* | 4/2007 | Cohen | H04W 40/18 455/63.4 |
| 2012/0127947 A1 | 5/2012 | Usui | |
| 2014/0349630 A1* | 11/2014 | Hyde | H04B 7/026 455/418 |
| 2016/0261989 A1* | 9/2016 | Pitcher | H04W 4/029 |
| 2017/0302776 A1* | 10/2017 | Lu | H04B 17/309 |

* cited by examiner (A) t1

(B)

(C) t2

(D)

4230 CONTROL
- 4231 PROPA PATH CHARA ACQUIRE
- 4232 RESOURCE SELECT
- 4233 TIMING DETERMINE
- 4234 COMM CONTROL
- 4235 REPRODUCIBILITY DETERMINE

| USE PATTERNS / INDEXES | SINGLE STREAM | | | MULTI-STREAM | |
|---|---|---|---|---|---|
| | BEAM FORM | | DIVER-SITY | 2 | 3 |
| | DIRECTIVITY 1 | DIRECTIVITY 2 | | | |
| REPRODUCIBILITY INDEXES | 2 | 6 | 4 | 3 | 2 |
| AMOUNT OF RESOURCE HAVING SN ≥ STANDARD | 3 | 7 | 6 | 12 | 9 |
| MAX SPEED | 1 | 2 | 2 | 4 | 3 |

MAX RELIABILITY     MAX SPEED

MOBILE COMMUNICATION SYSTEM FOR SELECTING COMMUNICATION RESOURCE AND COMMUNICATION APPARATUS FOR SELECTING COMMUNICATION RESOURCE

CROSS REFERENCE TO RELATED APPLICATION

The present application is a continuation application of U.S. patent application Ser. No. 15/419,839 filed on Jan. 30, 2017, which is based on Japanese Patent Application No. 2016-19254 filed on Feb. 3, 2016 and Japanese Patent Application No. 2016-178771 filed on Sep. 13, 2016, the disclosures of which are incorporated herein by reference.

TECHNICAL FIELD

The present disclosure relates to a mobile communication system and to a communication apparatus included in the mobile communication system. More particularly, the present disclosure relates to a technology for establishing highly reliable communication.

BACKGROUND

Patent Literature 1: JP 2011-172160 A

In multicarrier communication typically based on the OFDM (Orthogonal Frequency Division Multiplexing) method, a reception apparatus estimates, in some cases, a propagation path based on a received signal and feeds a propagation path estimation result back to a transmission apparatus as disclosed in Patent Literature 1. Based on the fed-back propagation path estimation result, the transmission apparatus schedules resources for communication with the reception apparatus so as to reduce power loss, for instance. This inhibits the quality of communication from being degraded by the influence of a multipath propagation path.

SUMMARY

The influence of a multipath varies with place and frequency. In a mobile communication apparatus on a mobile object, a position where the propagation path estimation result is transmitted is often different from a position where communication is established with a resource allocated based on the propagation path estimation result. The influence of the multipath propagation path when the communication is established is thus changed from the influence when the propagation path estimation result was transmitted. Even using the resource determined based on the propagation path estimation result for communication purposes may not lead to highly reliable communication.

It is an object of the present disclosure to provide a mobile communication system and a communication apparatus that are capable of establishing highly reliable communication.

To achieve the above object, according to a first example of the present disclosure, a mobile communication system is provided as including (i) a mobile communication apparatus in a mobile object and (ii) a target communication apparatus that is a target with which the mobile communication apparatus communicates. The mobile communication apparatus includes a selected resource antenna permitting communication using a selected resource and establishes wireless communication using the selected resource antenna. The mobile communication system includes a propagation path characteristics acquirer section and a resource selector section. The propagation path characteristics acquirer section acquires propagation path characteristics information in association with a future communication position, the propagation path characteristics information being information about propagation path characteristics between (i) the target communication apparatus and (ii) a reference antenna that is equal to the selected resource antenna in antenna characteristics that includes at least an antenna format. Based on the propagation path characteristics information acquired by the propagation path characteristics acquirer section, the resource selector section selects in advance a resource used in communication at the future communication position between the mobile communication apparatus and the target communication apparatus before the selected resource antenna of the mobile communication apparatus comes to be placed at the future communication position.

The propagation path characteristics acquirer section acquires the propagation path characteristics information in association with the future communication position. The propagation path characteristics information is about the propagation path characteristics between the target communication apparatus and the reference antenna having the same characteristics as the selected resource antenna. This enables the resource selector section to select a resource for use at the future communication position for the communication between the mobile communication apparatus and the target communication apparatus before the selected resource antenna of the mobile communication apparatus reaches or is placed at the future communication position. The resource selected by the resource selector section can be thus used at the future communication position to establish communication, providing highly reliable communication.

To achieve the above object, according to a second example of the present disclosure, a communication apparatus is provided as communicating with a mobile communication apparatus used in a mobile object. The mobile communication apparatus includes a selected resource antenna permitting communication using a selected resource. The communication apparatus includes a propagation path characteristics acquirer section and a resource selector section. The propagation path characteristics acquirer section acquires propagation path characteristics information in association with a future communication position, the propagation path characteristics information being information about propagation path characteristics between the communication apparatus and a reference antenna that is equal to the selected resource antenna in antenna characteristics including at least an antenna format. Based on the propagation path characteristics information acquired by the propagation path characteristics acquirer section, the resource selector section selects, in advance, a resource used in communication at the future communication position between the mobile communication apparatus and the communication apparatus before the selected resource antenna of the mobile communication apparatus comes to be placed at the future communication position.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

First Embodiment

Embodiments of the present disclosure will now be described with reference to the accompanying drawings. As in FIG. 1, a mobile communication system 100 according to a first embodiment includes a base station 200 and an in-vehicle terminal 300. The in-vehicle terminal 300 corresponds to a mobile communication apparatus.

Figure 1:
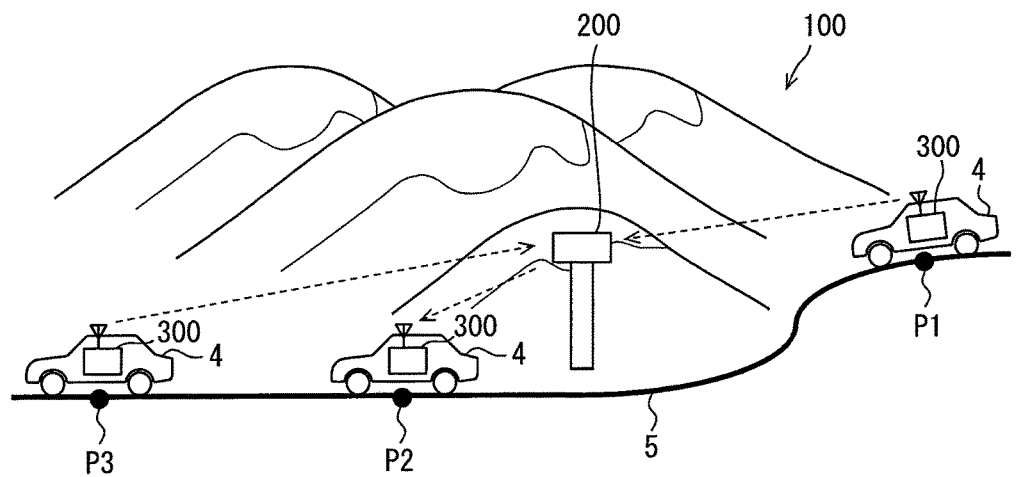
FIG. 1 is a diagram illustrating a configuration of a mobile communication system according to a first embodiment.

The base station 200 corresponds to a target communication apparatus or a communication apparatus. The base station 200 is fixed at a predetermined location and used to communicate with the in-vehicle terminal 300. The in-vehicle terminal 300 is mounted in a vehicle 4, that is, a mobile object. Here, the vehicle 4 represents an automobile. In FIG. 1, the vehicle 4, which is traveling on a road 5, is depicted at three points (i.e., spots) P1, P2, and P3. The vehicle 4 positioned at these three points indicates that the same vehicle 4 sequentially moves from point P1 through point P2 to point P3. Thus, FIG. 1 depicts only one vehicle 4. In reality, the in-vehicle terminal 300 is mounted in each of a plurality of vehicles 4. Additionally, a plurality of base stations 200 may be installed.

[Configuration of Base Station 200]

Figure 2:
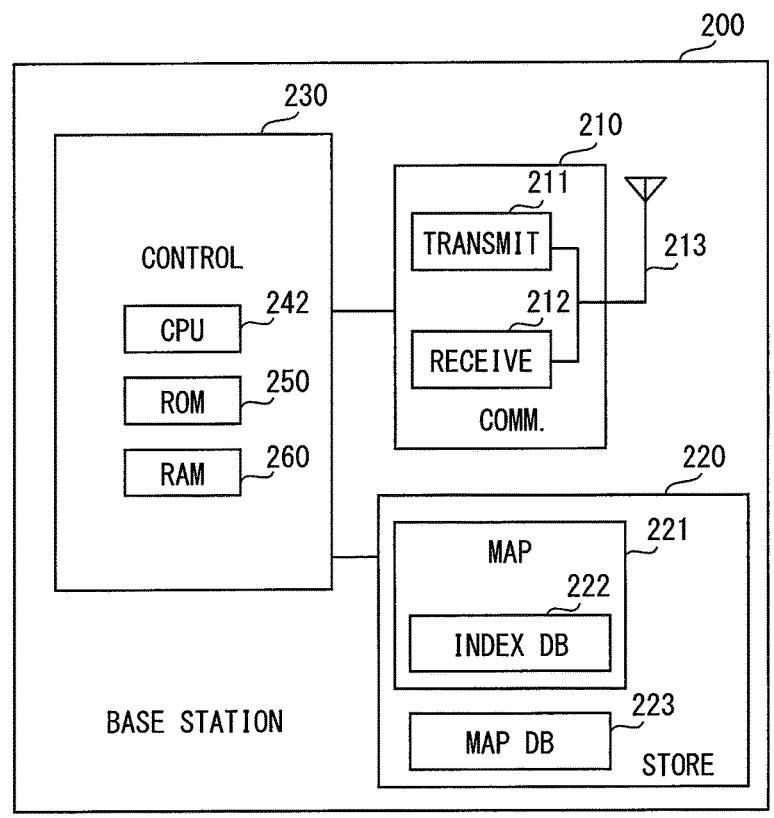
FIG. 2 is a block diagram illustrating a configuration of a base station in FIG. 1.

As in FIG. 2, the base station 200 includes a communicator 210, a storage unit 220, and a control circuit 230. The communicator 210, which may be also referred to as a transceiver, includes a transmitter 211, a receiver 212, and an antenna 213. The transmitter 211 modulates and amplifies various signals inputted from the control circuit 230 and transmits the resulting signals to an outside source through the antenna 213. The transmitter 211 according to the first embodiment employs OFDMA (orthogonal frequency-division multiple access) as the access scheme and selects either a phase-shift keying modulation method or a quadrature amplitude modulation method. The receiver 212 demodulates a signal received by the antenna 213 and inputs the demodulated signal to the control circuit 230.

Figure 3:
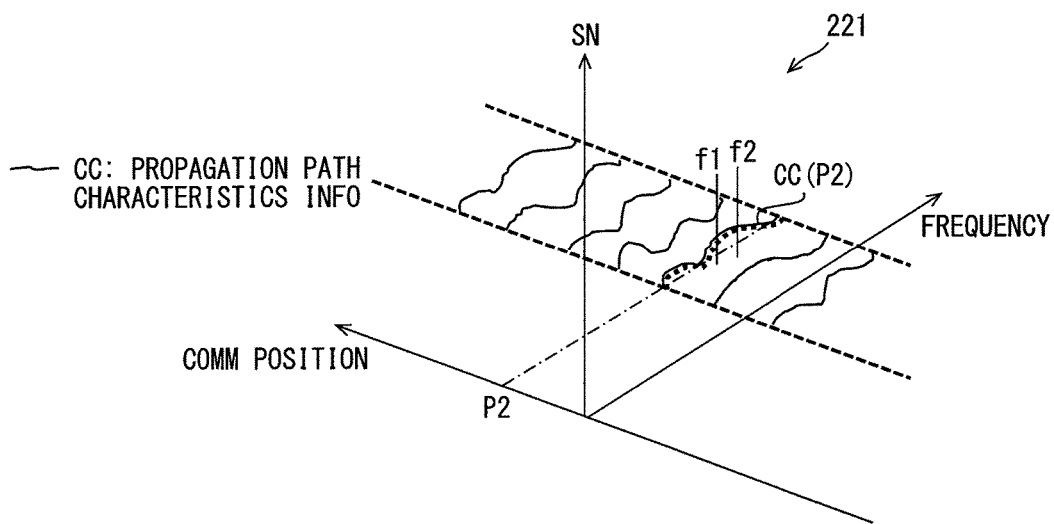
FIG. 3 is a diagram illustrating a radio wave propagation map.

The storage unit 220 is writable and stores a radio wave propagation map 221 and a road map database 223. The radio wave propagation map 221 is a database that stores propagation path characteristics information CC about various communication positions. The propagation path characteristics information CC indicates propagation path characteristics estimated by OFDM (orthogonal frequency-division multiplexing). The propagation path characteristics information CC, which signifies the frequency characteristics of a propagation path, indicates the characteristics of intensity and phase with respect to frequency. The propagation path characteristics information CC is illustrated in FIG. 3 as the relationship between frequency and signal-tonoise ratio at various communication positions. The radio wave propagation map 221 indicates which frequency exhibits an improved signal-to-noise ratio at each communication position. The radio wave propagation map 221 is created for each model of the in-vehicle terminal 300. Note that "information" may be used in the present disclosure not only uncountable but also countable; information may be equivalent to an information item while a plurality of informations may be equivalent to a plurality of information items, for instance.

The radio wave propagation map 221 is created for each model of the in-vehicle terminal 300. This is because antenna characteristics vary with the model of the in-vehicle terminal 300 having an antenna 313. In the embodiment, the antenna 313 functions as a reference antenna or as a selected resource antenna. The radio wave propagation map 221 is created for each model of the in-vehicle terminal 300; thus, the radio wave propagation map 221 is created for each model of the antenna 313 of the in-vehicle terminal 300. Further, the antenna 313 functions as the reference antenna; thus, the radio wave propagation map 221 is created for each of a plurality of reference antennas. The model of the in-vehicle terminal 300 corresponds to antenna determination information.

As the radio wave propagation map 221 is created for each model of the in-vehicle terminal 300, the radio wave propagation map 221 can be created based on the propagation path characteristics information CC acquired by antennas having the same antenna characteristics. However, even when the antenna characteristics are not the same, the radio wave propagation map 221 may be created alternatively based on another propagation path characteristics information CC, which is acquired when communicating with the base station 200 by using the reference antenna having the same antenna characteristics as the selected resource antenna. Specifically, the antenna characteristics are determined by directivity, sensitivity, or features affecting the directivity or sensitivity. For example, an antenna format is one element that determines the antenna characteristics. The term "antenna type" may be used as a substitute for the antenna format. If antennas having the same antenna format are installed under different conditions, the antennas generally have different antenna characteristics. For example, if one of antennas having the same antenna format is installed on the roof of the vehicle and another antenna is installed in the interior of the vehicle, they do not exhibit the same antenna characteristics because they differ in directivity. In addition, the antenna characteristics may include an antenna posture.

Even if the antennas differ in antenna format or in antenna posture, they may be considered to have the same antenna characteristics as far as the antennas are similar in antenna format and antenna posture. The degree of similarity by which the antennas may be considered to have the same antenna characteristics can be set as appropriate depending on required accuracy.

The radio wave propagation map 221 includes a reliability index database 222. The reliability index database 222 is a database of reliability indexes for variety of propagation path characteristics information CC included in the radio wave propagation map 221. The reliability indexes indicate the degree of reliability of associated propagation path characteristics information CC. In the embodiment, the reliability indexes are determined based on a reproducibility index indicative of the degree of reproducibility of the propagation path characteristics information CC.

The reproducibility index is a value indicative of the spread of distribution of the propagation path characteristics information CC acquired multiple times at substantially the same communication position. The wider the spread of distribution, the lower the reproducibility indicated by the reproducibility index. The degree of positional difference by which the communication positions may be considered to be substantially the same can be set as appropriate depending on required accuracy.

Each of the reliability indexes is a value that is obtained by decreasing the reproducibility index for an error resource upon each occurrence of an error. The road map database 223 is a database of road maps in digital form.

For instance, in the embodiment, the control circuit 230, which may be also referred to as an electronic control unit, may be a computer having a CPU 242, a ROM 250, and a RAM 260. The CPU 242 executes programs in the ROM 250 or other non-transitory tangible storage medium while using a temporary storage function of the RAM 260. This enables the control circuit 230 to function as various sections in FIG. 4. Further, when the control circuit 230 executes the functions of the various sections, methods corresponding to the programs are executed. Some or all of the functions executed by the control circuit 230 may alternatively be implemented by hardware such as one or more ICs.

[Configuration of Control Circuit 230]

Figure 4:
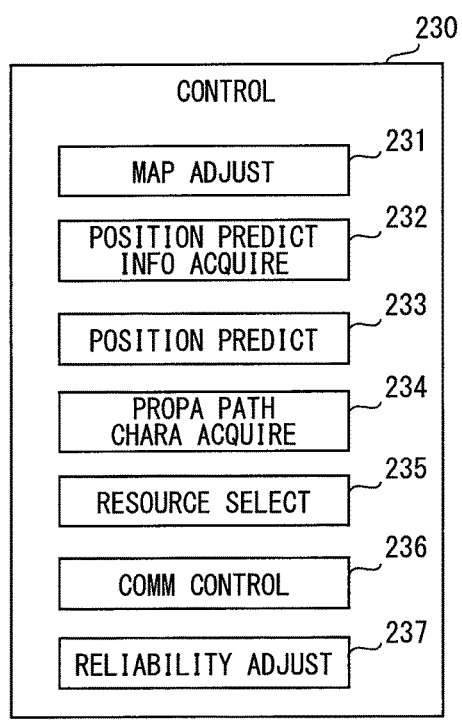
FIG. 4 is a block diagram illustrating the functions of a control circuit in FIG. 2.

As in FIG. 4, the control circuit 230 includes a map adjuster section 231 (which may be also referred to as a map update section or a map update processor section), a position prediction information acquirer section 232, a position predictor section 233, a propagation path characteristics acquirer section 234, a resource selector section 235, a communication controller section 236, and a reliability adjuster section 237. Note that, components such as the resource selector section 235 included in a control circuit such as the control circuit 230 each are named as being assigned with "section"; however, those components may be also named, e.g., a resource selector, without being assigned with "section." This may apply to other embodiments or modifications in addition to the first embodiment.

First, the map adjuster section 231 will be described. The base station 200 periodically transmits a reference signal R to a surrounding area. The reference signal R is a signal for propagation path estimation. Specifically, the reference signal R is a pilot signal whose amplitude and phase are known or a signal including a pilot signal. The reference signal R is a known signal allocated to all subchannels. Upon receipt of the reference signal R, the in-vehicle terminal 300 determines the propagation path characteristics information CC based on the reception condition of the received reference signal R.

The in-vehicle terminal 300 asynchronously uploads (i) the determined propagation path characteristics information CC, (ii) a reference signal reception position that is a position where the reference signal R is received, and (iii) the model of the in-vehicle terminal 300, to the base station 200. When the receiver 212 of the base station 200 receives the uploaded information, the map adjuster section 231 acquires the propagation path characteristics information CC, the reference signal reception position, and the model of the in-vehicle terminal 300, from the receiver 212. The map adjuster section 231 then identifies the radio wave propagation map 221 to be updated based on the acquired model, and updates (i.e., adjusts) the identified radio wave propagation map 221 by using the propagation path characteristics information CC and the reference signal reception position, which are acquired from the receiver 212. The update may be performed, for example, by calculating, based on the number of previously acquired propagation path characteristics informations CC, the weighted average of the propagation path characteristics information CC in the radio wave propagation map 221 corresponding to the acquired reference signal reception position and the acquired propagation path characteristics information CC.

The position prediction information acquirer section 232 will now be described. As described later, the in-vehicle terminal 300 transmits position prediction information to the base station 200. The position prediction information includes the position of the antenna 313 at the time of position prediction information transmission by the in-vehicle terminal 300 (hereinafter referred to as the uploading-time position), the movement speed of the in-vehicle terminal 300 at the time of uploading, the ID of the in-vehicle terminal 300, and the model of the in-vehicle terminal. As the position prediction information includes the uploading-time position and the movement speed, the position of the antenna 313 can be predicted after the upload. The position prediction information may include the travel direction of the in-vehicle terminal 300. However, the travel direction can be predicted based on temporal changes in the uploading-time position. Further, the travel direction can be predicted more accurately when a road extension direction is used in addition to the temporal changes in the uploading-time position. Therefore, the position prediction information need not always include the travel direction. The position prediction information is received by the receiver 212 of the base station 200. The position prediction information acquirer section 232 acquires the position prediction information from the receiver 212.

Based on the position prediction information acquired by the position prediction information acquirer section 232, the position predictor section 233 successively determines a future predicted position of the antenna 313 of the in-vehicle terminal 300. Specifically, from the movement speed of the in-vehicle terminal 300, which is included in the position prediction information, and the elapsed time from the time of position prediction information reception, the position predictor section 233 calculates the distance that is moved by the in-vehicle terminal 300 from the time of position prediction information update by the in-vehicle terminal 300. The predicted position is a position that is obtained when the uploading-time position is moved in the movement direction of the in-vehicle terminal 300 by the moved distance. The movement direction of the in-vehicle terminal 300 may be determined based on a track moved by the in-vehicle terminal 300, which is determined from the position prediction information successively acquired from the same in-vehicle terminal 300. If the position prediction information includes the travel direction of the in-vehicle terminal 300, the travel direction may be regarded as the movement direction of the in-vehicle terminal 300.

The propagation path characteristics acquirer section 234 regards the predicted position predicted by the position predictor section 233 as a communication position (i.e., a future communication position), and acquires the propagation path characteristics information CC about the communication position from the radio wave propagation map 221 in association with the communication position. The position prediction information includes the model of the in-vehicle terminal 300, and the radio wave propagation map 221 is created for each model of the in-vehicle terminal 300. Therefore, the radio wave propagation map 221 from which the propagation path characteristics information CC is acquired is the same radio wave propagation map 221 as for the model of the in-vehicle terminal 300 that is included in the position prediction information. FIG. 3 indicates, as an example, the propagation path characteristics information CC (P2), which is acquired from the radio wave propagation map 221 when point P2 is a predicted position, by using a combination of solid line and dotted line along the solid line.

Based on the propagation path characteristics information CC acquired by the propagation path characteristics acquirer section 234, the resource selector section 235 selects a resource that is to be used for communicating with the in-vehicle terminal 300 at the predicted position (i.e., a future communication position) predicted by the position predictor section 233. For example, as in FIG. 3, the propagation path characteristics information CC (P2) indicates that the signal-to-noise ratio is high between frequency f1 and frequency f2. Therefore, a subcarrier using a frequency between frequencies f1 and f2 is selected as a frequency resource to be used for communicating with the in-vehicle terminal 300 in a time slot including a time at which the in-vehicle terminal 300 is placed at the communication position. This results in the selection of a frequency resource in a certain time slot (i.e., a time resource).

A reliability index corresponding to the propagation path characteristics information CC is also used to select a resource. A frequency resource having a relatively low reliability index is selected with the signal-to-noise ratio corrected to a relatively small value in coordination with low reliability.

The above explanation applies to a case acquiring the propagation path characteristics information CC for one in-vehicle terminal 300. In contrast, acquiring the propagation path characteristics information CC for a plurality of in-vehicle terminals 300 needs to optimize a resource allocation.

Such optimization is to maximize the total or average amount of time and frequency resource that keeps radio attenuation for one or more in-vehicle terminals 300 not higher than a predetermined level (i.e., keeps the signal-to-noise ratio not lower than a predetermined level). The method of selecting a frequency resource based on acquired propagation path characteristics may be the same as the method used in an existing system such as an LTE cellular system.

The resource selector section 235 selects a resource for use in communication with the in-vehicle terminal 300 at a predicted position, that is, at a position still not reached by the in-vehicle terminal 300. This allows the resource to be selected before the antenna 313 of the in-vehicle terminal 300 reaches the predicted position, i.e., comes to be placed at the predicted position (i.e., the future communication position).

While successively determining the position of the in-vehicle terminal 300 based on the position prediction information, the communication controller section 236 uses the resource selected by the resource selector section 235 as the resource for the determined position and controls the transmitter 211 to perform a communication with the in-vehicle terminal 300.

Such communication may adopt a modulation method of either a phase-shift keying modulation or a quadrature amplitude modulation as mentioned-above for the transmitter 211. The phase-shift keying modulation may select BPSK or QPSK; the quadrature amplitude modulation may select 16 QAM, 64 QAM, or 256 QAM. BPSK, QPSK, 16 QAM, 64 QAM, and 256 QAM are such that communication speed and reliability are contradictory to each other. Specifically, the higher the communication speed, the lower the reliability. Therefore, the reliability of a selected resource is determined according to the signal-to-noise ratio; a modulation method providing a relatively high communication speed is selected when the reliability is relatively high. Namely, a modulation method providing a relatively low communication speed is selected when the reliability is relatively low. Further, relatively high redundancy may be employed (i.e., a relatively low code rate may be employed) when the reliability is relatively low. In FIG. 1, the base station 200 transmits a signal to the in-vehicle terminal 300 by using a selected frequency resource when the vehicle 4 is positioned at point P2.

The above communication controller section 236 applies to a downlink, but may also apply to an uplink communicating with the in-vehicle terminal 300 by using a resource selected by the resource selector section 235.

When a resource selected by the resource selector section 235 is used for an uplink, the communication controller section 236 should transmit a signal indicative of the resource selected by the resource selector section 235 to the in-vehicle terminal 300 before the in-vehicle terminal 300 reaches the communication position.

Upon receipt of the signal transmitted from the base station 200, the in-vehicle terminal 300 checks for an error in the signal. Error resource information including an error resource and the current position of the antenna 313 is then uploaded to the base station 200.

When the receiver 212 of the base station 200 receives the error resource information, the reliability adjuster section 237 acquires the error resource information from the receiver 212. Then, based on the acquired error resource information, the reliability index for the communication position and frequency resource determined by the error resource information, which is among the reliability indexes in the reliability index database 222, is lowered by a predetermined amount or by a predetermined percentage.

[Configuration of in-Vehicle Terminal 300]

Figure 5:
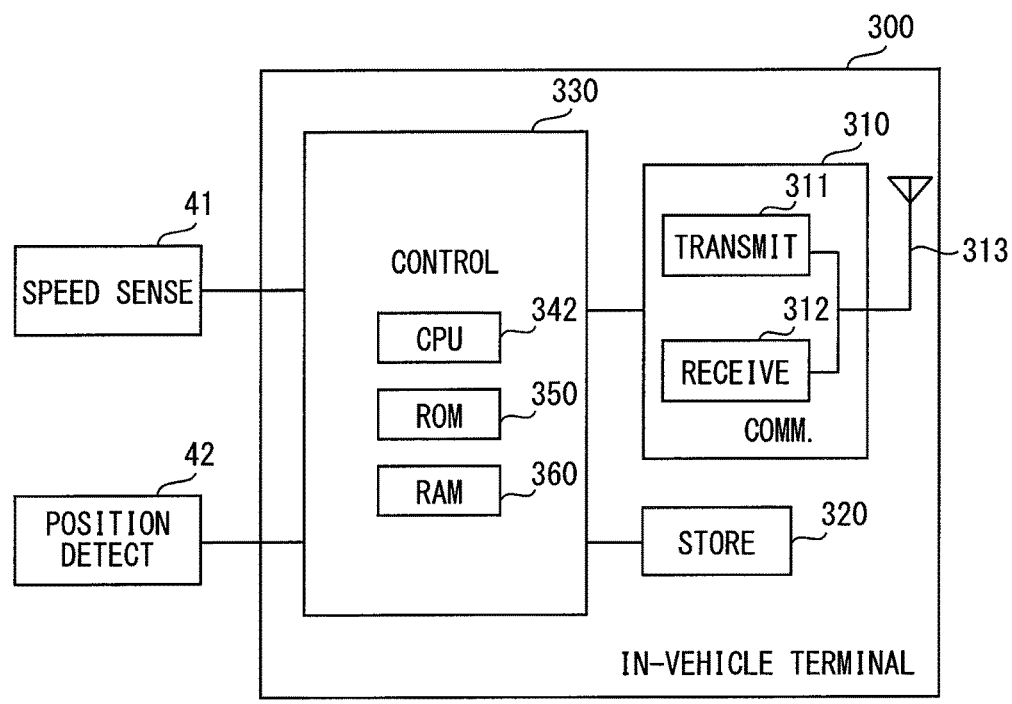
FIG. 5 is a block diagram illustrating a configuration of an in-vehicle terminal.

As in FIG. 5, the in-vehicle terminal 300 includes a communicator 310, a storage unit 320, and a control circuit 330. The communicator 310, which may be also referred to as a transceiver, includes a transmitter 311, a receiver 312, and the antenna 313. The transmitter 311 modulates and amplifies various signals inputted from the control circuit 330 and transmits the resulting signals to an outside source through the antenna 313. The transmitter 311 according to the embodiment employs SC-FDMA as the access scheme and selects either a phase-shift keying modulation method or a quadrature amplitude modulation method. The receiver 312 demodulates a signal received by the antenna 313 and inputs the demodulated signal to the control circuit 330. As mentioned, the antenna 313 functions as the reference antenna and as the selected resource antenna. Various information can be written into the storage unit 320, which is controlled by the control circuit 330.

For instance, in the embodiment, the control circuit 330, which may be also referred to as an electronic control unit, may be a computer having a CPU 342, a ROM 350, and a RAM 360. The CPU 342 executes programs stored in the ROM 350 or other non-transitory tangible storage medium while using a temporary storage function of the RAM 360. This enables the control circuit 330 to function as various sections in FIG. 6. Further, when the control circuit 330 executes the functions of the various sections, methods corresponding to the programs are executed. Some or all of the functions executed by the control circuit 330 may alternatively be implemented by hardware such as one or more ICs.

A speed sensor 41 successively detects the movement speed of the in-vehicle terminal 300 and inputs the detected movement speed to the control circuit 330. A vehicle speed sensor detecting the speed of the vehicle 4 may be used as the speed sensor 41.

A position detector 42 includes a GNSS (Global Navigation Satellite System) receiver that receives a navigation signal transmitted from a navigation satellite included in a GNSS. The position detector 42 successively detects the current position based on the navigation signal received by the GNSS receiver. The detected current position is then successively inputted to the control circuit 330.

[Configuration of Control Circuit 330]

Figure 6:
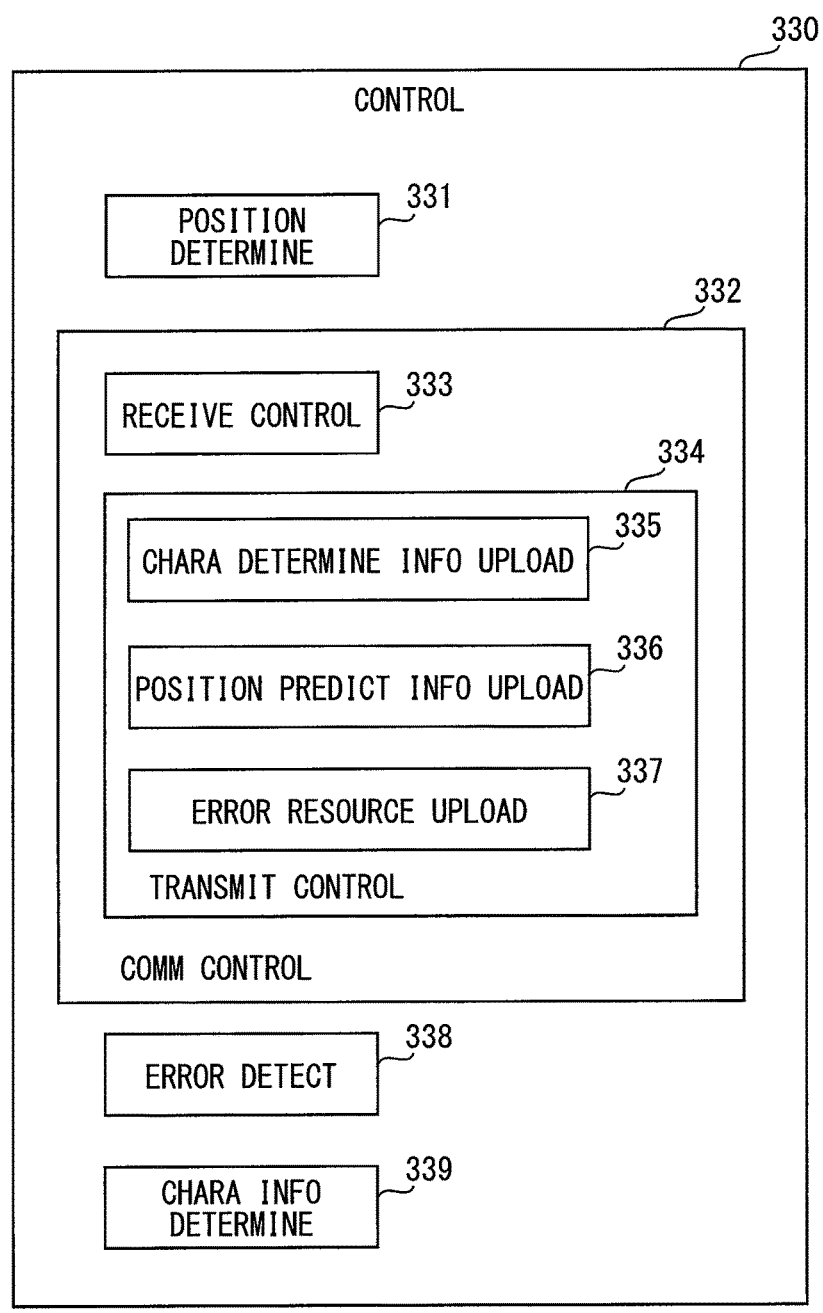
FIG. 6 is a block diagram illustrating the functions of a control circuit in FIG. 5.

As in FIG. 6, the control circuit 330 includes a position determiner section 331, a communication controller section 332, an error detector section 338, and a characteristics information determiner section 339. Note that, components such as the characteristics information determiner section 339 included in a control circuit such as the control circuit 330 each are named as being assigned with "section"; however, those components may be also named, e.g., a characteristics information determiner, without being assigned with "section." This may apply to other embodiments or modifications in addition to the first embodiment.

The position determiner section 331 successively determines the current position of the antenna 313 by successively acquiring the current position detected by the position detector 42. The current position detected by the position detector 42 is the position where the position detector 42 is disposed, and is not the current position of the antenna 313. Therefore, the current position detected by the position detector 42 may be corrected based on the difference between the position of the antenna 313 and the position of the position detector 42 to use the corrected current position as the current position of the antenna 313. In the embodiment, the antenna 313 functions as the reference antenna and as the selected resource antenna. Therefore, even if the position of the position detector 42 is the position of the reference antenna and the position of the selected resource antenna, it does not affect the accuracy with which the selected resource antenna is determined to be placed at the position of the reference antenna. If the position error of the reference antenna is equal to the position error of the selected resource antenna, it is not necessary to correct the current position detected by the position detector 42 and use the corrected current position as the current position of the antenna 313.

The communication controller section 332 includes a reception controller section 333 and a transmission controller section 334. The reception controller section 333 decrypts a signal for a resource block allocated to the local terminal (i.e., the in-vehicle terminal 300 itself), among signals that are transmitted from the base station 200 and received by the antenna 313. What resource is allocated to the local terminal is determined by a method preselected for each wireless system. In the LTE cellular system, for example, the determination is made based on allocation information in a control channel area of each wireless frame. The antenna 313 is used to receive a signal of a resource selected by the resource selector section 235 of the base station 200. Thus, the antenna 313 corresponds to the selected resource antenna.

Before the transmission controller section 334, the error detector section 338 and the characteristics information determiner section 339 will be described. The error detector section 338 uses a well-known error detection method based on an error-correcting code to check for an error in a signal that is transmitted by using a resource allocated to the local terminal.

When the receiver 312 receives the reference signal R from the base station 200, the characteristics information determiner section 339 acquires the reference signal R from the receiver 312 and determines the propagation path characteristics information CC on the reception condition of the received reference signal R. The method of estimating the propagation path characteristics information CC based on the received reference signal R may be the same as a method widely used, for example, for MIMO. The propagation path characteristics information CC is also referred to as a propagation path state or a propagation path estimation result. The propagation path characteristics information CC is expressed by frequency-specific power and phase.

The transmission controller section 334 includes a characteristics determination information uploader section 335, a position prediction information uploader section 336, and an error resource uploader section 337. The characteristics determination information uploader section 335 uploads (i) the position (i.e, received position) where the reference signal R is received, (ii) the propagation path characteristics information CC determined by the characteristics information determiner section 339, and (iii) the model of the in-vehicle terminal 300, from the transmitter 311 to the base station 200. The time of uploading is not limited to the time of determining the propagation path characteristics information CC, that is, the upload may be performed asynchronously. In FIG. 1, the in-vehicle terminal 300 uploads the propagation path characteristics information CC at a time when the vehicle 4 is positioned at point P1.

As mentioned, the propagation path characteristics information CC uploaded by the characteristics determination information uploader section 335 is used when the map adjuster section 231 of the control circuit 230 in the base station 200 updates the radio wave propagation map 221. Therefore, the antenna 313 functions as the reference antenna.

The position prediction information uploader section 336 successively uploads the aforementioned position prediction information to the base station 200. As mentioned, the position prediction information includes (i) the uploading-time position that is the position of the antenna 313 at the time of position prediction information transmission from the in-vehicle terminal 300, (ii) the movement speed of the in-vehicle terminal 300 at the time of uploading, (iii) the ID of the in-vehicle terminal 300, and (iv) the model of the in-vehicle terminal 300.

The error resource uploader section 337 uploads, to the base station 200, error resource information indicative of a resource used for the transmission of a signal in which an error is detected by the error detector section 338. The error resource information includes (i) the frequency resource in which an error occurred and (ii) the position where the error occurred.

The upload of the error resource information may be asynchronously timed. In FIG. 1, the in-vehicle terminal 300 uploads the error resource information about an error detected at point P2 when the vehicle 4 is positioned at point P3.

[Summary of First Embodiment]

In the first embodiment, the base station 200 includes the propagation path characteristics acquirer section 234; the propagation path characteristics acquirer section 234 acquires the propagation path characteristics information CC, which was obtained when the antenna 313 previously communicated with the base station 200, from the radio wave propagation map 221, in association with a predicted position (i.e., a future communication position).

When the propagation path characteristics information CC is acquired in association with the future communication position, the resource selector section 235 can select a resource to be used when the in-vehicle terminal 300 communicates with the base station 200 at the communication position before the antenna 313 of the in-vehicle terminal 300 comes to be placed at the communication position (i.e., before reaching the communication position). Thus, the resource selected by the resource selector section 235 can be used at the communication position to establish communication with high reliability.

Second Embodiment

A second embodiment will now be described. In the second and subsequent embodiments, elements designated by the same reference numerals as the previously used ones are identical with the elements designated by the same reference numerals unless specifically stated otherwise. Further, when only part of configuration is described, previously described embodiments can be applied to the other part thereof.

Figure 7:
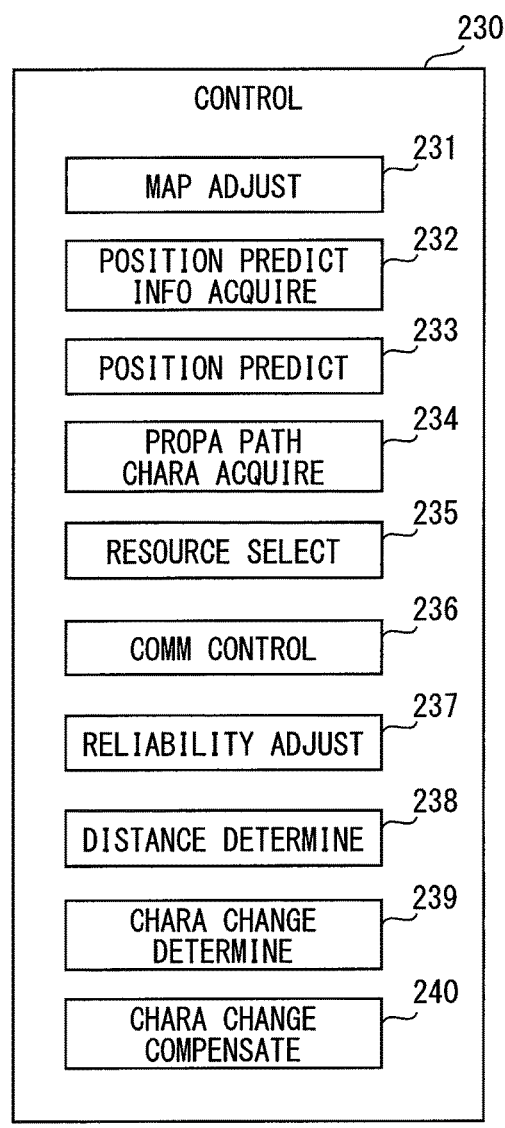
FIG. 7 is a block diagram illustrating the functions of a control circuit in a base station in accordance with a second embodiment.

As in FIG. 7, the control circuit 230 according to the second embodiment includes a distance determiner section 238, a characteristics change determiner section 239, and a characteristics change compensator section 240, in addition to the sections included in the first embodiment.

The distance determiner section 238 acquires the movement speed of the in-vehicle terminal 300, which is included in the position prediction information, from the receiver 212 that received the position prediction information. The distance moved during one communication period is determined by multiplying the movement speed by a predefined communication time per communication.

The characteristics change determiner section 239 determines the communication position for the start of communication based on the result of prediction by the position predictor section 233. Further, the characteristics change determiner section 239 determines the communication position for the end of communication by adding the distance moved during one communication period, which is determined by the distance determiner section 238, to the communication position for the start of communication. The characteristics change determiner section 239 then acquires from the radio wave propagation map 221 (i) the propagation path characteristics information CC about the communication position for the start of communication and (ii) the propagation path characteristics information CC about the communication position for the end of communication.

Next, the ratio of the propagation path characteristics information CC about the communication position for the end of communication to the propagation path characteristics information CC about the communication position for the start of communication is regarded as a change in the propagation path characteristics information CC during the communication period.

The characteristics change compensator section 240 compensates for a communication signal so as to reduce the influence exerted upon communication by the change in the propagation path characteristics information CC during the communication period, the change being determined by the characteristics change determiner section 239. The communication signal is either an outgoing signal or an incoming signal. The radio wave propagation map 221 is necessary for making the above compensation. Therefore, the communication signal is an outgoing signal if a transmitting end has the radio wave propagation map 221, and is an incoming signal if a receiving end has the radio wave propagation map 221.

In the second embodiment, the base station 200 includes the radio wave propagation map 221. Therefore, when the base station 200 transmits a signal, the signal transmitted from the base station 200 is compensated for, and when the base station 200 receives a signal, the signal received by the base station 200 is compensated for.

If it is determined by the characteristics change determiner section 239 that, for example, the signal-to-noise ratio at the start of transmission is reduced to half at the end of transmission, the compensation is made so that transmission power used at the end of transmission is two times as great as the transmission power used at the start of transmission. Further, if it is determined by the characteristics change determiner section 239 that a phase angle at the start of transmission advances by 90 degrees at the end of transmission, the phase angle of a signal at the end of transmission is delayed by 90 degrees from the phase angle at the start of transmission. The transmission power and phase angle between the start and end of transmission may be determined by interpolation.

Another example may compensate an uplink, i.e., a signal transmitted from the in-vehicle terminal 300. When an uplink signal is compensated for, the power and phase angle are compensated for before demodulating a signal received by the antenna 213.

Further, if having the radio wave propagation map 221 by downloading it from the base station 200, the in-vehicle terminal 300 may include the distance determiner section 238, the characteristics change determiner section 239, and the characteristics change compensator section 240.

Thus the second embodiment compares the propagation path characteristics information CC about the start of communication and the propagation path characteristics information CC about the end of communication with each other, and makes compensation so as to reduce the influence of a change in the propagation path characteristics information CC upon communication, further improving the reliability of communication.

Third Embodiment

In a third embodiment, the in-vehicle terminal 300 downloads the radio wave propagation map 221 stored in the storage unit 220 of the base station 200 and stores the downloaded radio wave propagation map 221 in the storage unit 320. In the third embodiment, the storage unit 320 corresponds to a download data storage unit.

The radio wave propagation map 221 stored in the storage unit 320 may be exactly the same as the radio wave propagation map 221 stored in the storage unit 220 of the base station 200. Alternatively, the radio wave propagation map 221 stored in the storage unit 320 may be limited to merely show an area around the current position.

Figure 8:
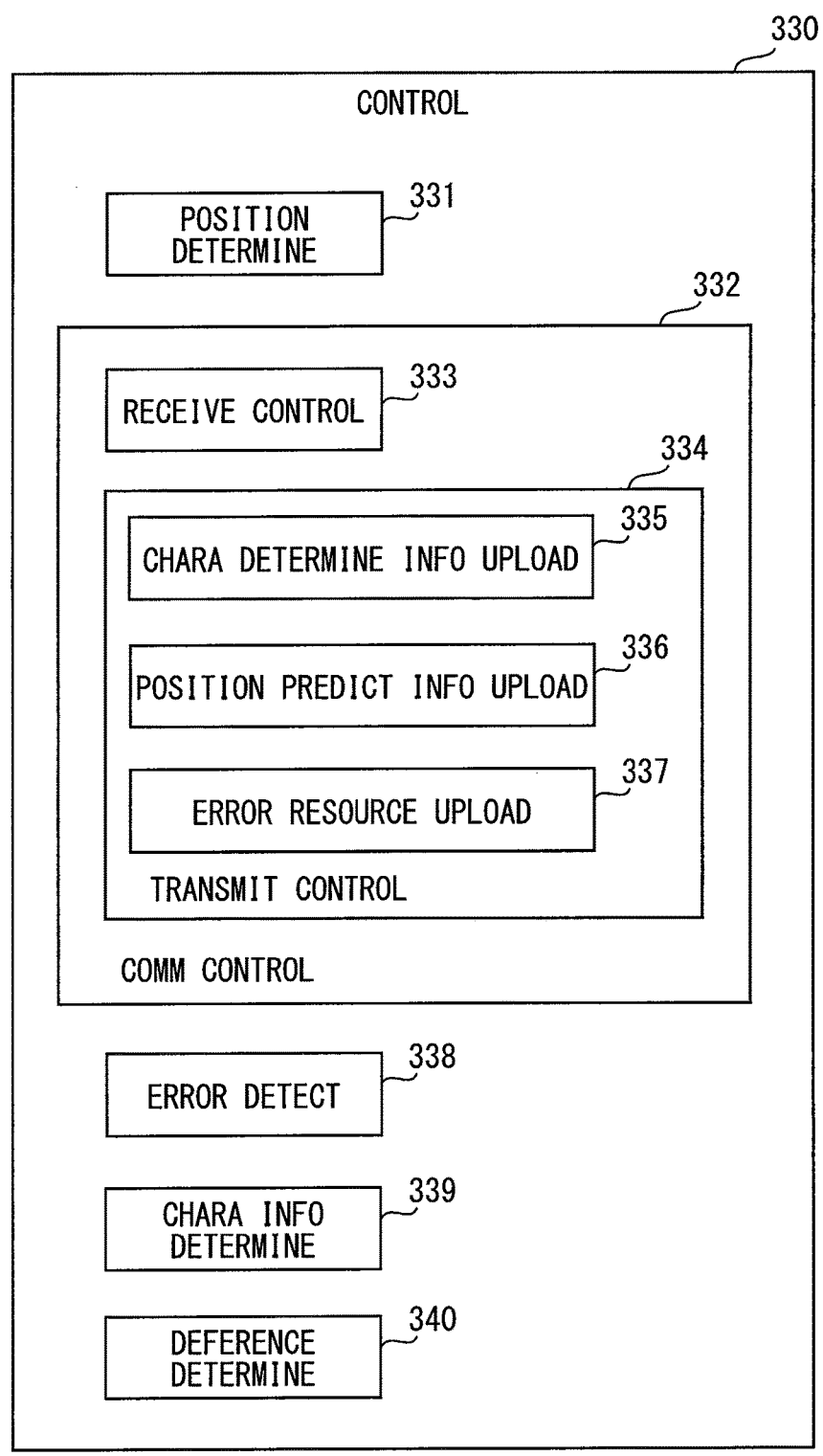
FIG. 8 is a block diagram illustrating the functions of a control circuit in an in-vehicle terminal in accordance with a third embodiment.

As in FIG. 8, the control circuit 330 of the in-vehicle terminal 300 according to the third embodiment includes a difference determiner section 340 in addition to the sections included in the first embodiment.

The difference determiner section 340 determines a propagation path characteristics difference. The propagation path characteristics difference is a difference between the propagation path characteristics information CC determined by the characteristics information determiner section 339 and a portion of the radio wave propagation map 221 stored in the storage unit 320 that corresponds to the propagation path characteristics information CC determined by the characteristics information determiner section 339. The propagation path characteristics difference may be determined in units of one propagation path characteristics information CC about each communication position or may be determined by dividing one propagation path characteristics information CC about each communication position into a plurality of frequency bands and comparing them.

The characteristics determination information uploader section 335 in the third embodiment uploads the propagation path characteristics difference determined by the difference determiner section 340 as characteristics determination information. This reduces the amount of data to upload, inhibiting a communication band from being compressed.

Fourth Embodiment

Figure 9:
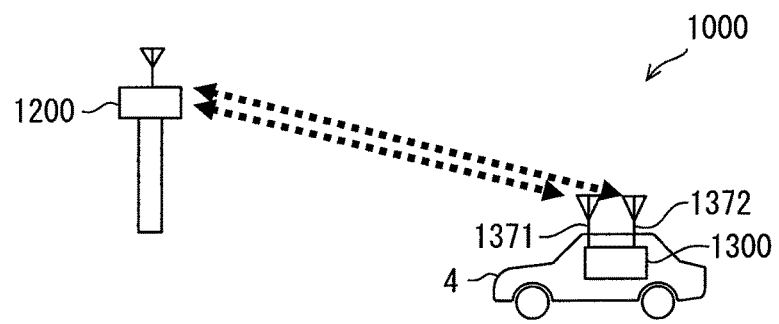
FIG. 9 is a diagram illustrating a configuration of a mobile communication system according to a fourth embodiment.

As in FIG. 9, a mobile communication system 1000 according to a fourth embodiment includes a base station 1200 and an in-vehicle terminal 1300. The base station 1200 corresponds to the target communication apparatus; the in-vehicle terminal 1300 corresponds to the mobile communication apparatus. The mobile communication system 1000 may include a plurality of base stations 1200 and a plurality of in-vehicle terminals 1300.

[Configuration of in-Vehicle Terminal 1300]

As in FIG. 9, the in-vehicle terminal 1300 includes a front antenna 1371 and a rear antenna 1372. These antennas 1371, 1372 are equal in structure, mounted on the roof of the vehicle 4 with a front-rear positional relation (i.e., longitudinally disposed in the travel direction of the vehicle 4), and positioned at the same height. The front antenna 1371 functions as the reference antenna; the rear antenna 1372 functions as the selected resource antenna.

Figure 10:
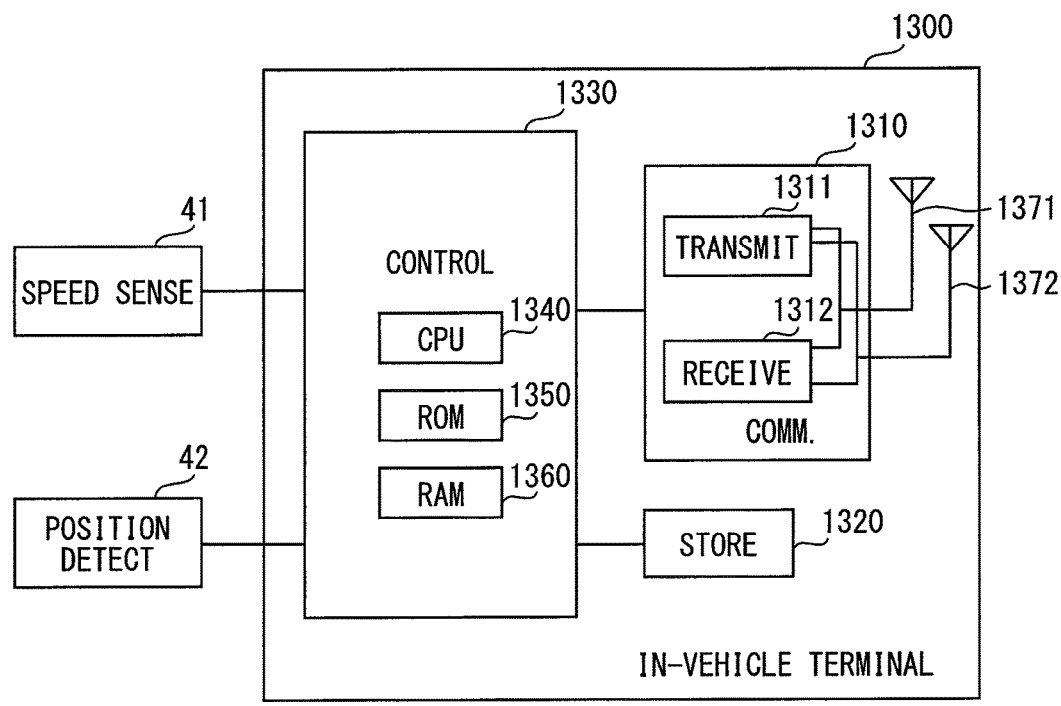
FIG. 10 is a block diagram illustrating a configuration of an in-vehicle terminal in FIG. 9.

As in FIG. 10, the in-vehicle terminal 1300 includes a communicator 1310, a storage unit 1320, and a control circuit 1330. The communicator 1310 includes a transmitter 1311 and a receiver 1312. The transmitter 1311 and the receiver 1312 selectively use the two antennas 1371, 1372 for transmission and reception. The transmitter 1311 and the receiver 1312 have the same functions as the transmitter 311 and receiver 312 in the first embodiment, but additionally have a function of switching between the antennas.

Figure 11:
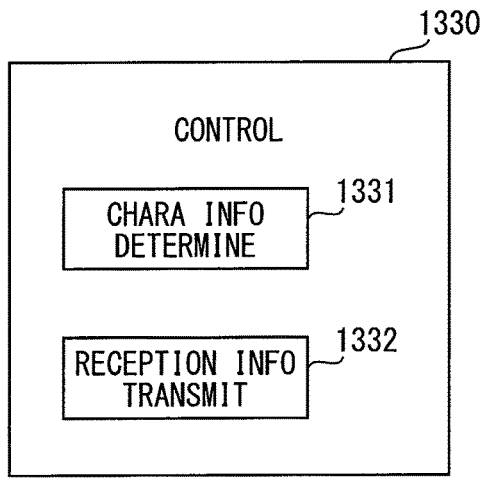
FIG. 11 is a block diagram illustrating the functions of a control circuit in FIG. 10.

As in FIG. 11, the control circuit 1330 includes, as its functions, a characteristics information determiner section 1331 and a reception information transmitter section 1332. First, the characteristics information determiner section 1331 will be described. In the fourth embodiment, too, the base station 1200 periodically transmits the reference signal R. Both the front antenna 1371 and the rear antenna 1372 can receive the reference signal R.

The characteristics information determiner section 1331 acquires from the receiver 1312 the reference signal R received by the front antenna 1371 or the rear antenna 1372, and determines the propagation path characteristics information CC in the same manner as the characteristics information determiner section 339 according to the first embodiment. The propagation path characteristics information CC determined from the reference signal R received by the front antenna 1371 is hereinafter referred to as the front antenna propagation path characteristics information CCA; the propagation path characteristics information CC determined from the reference signal R received by the rear antenna 1372 is hereinafter referred to as the rear antenna propagation path characteristics information CCB.

The reception information transmitter section 1332 uses the transmitter 1311 to transmit the followings to the base station 1200: the front antenna propagation path characteristics information CCA and rear antenna propagation path characteristics information CCB determined by the characteristics information determiner section 1331; the movement speed of the in-vehicle terminal 1300 at the time of reception of the reference signal R; the distance between the front antenna 1371 and the rear antenna 1372; and the ID of the in-vehicle terminal 1300.

[Configuration of Base Station 1200]

Figure 12:
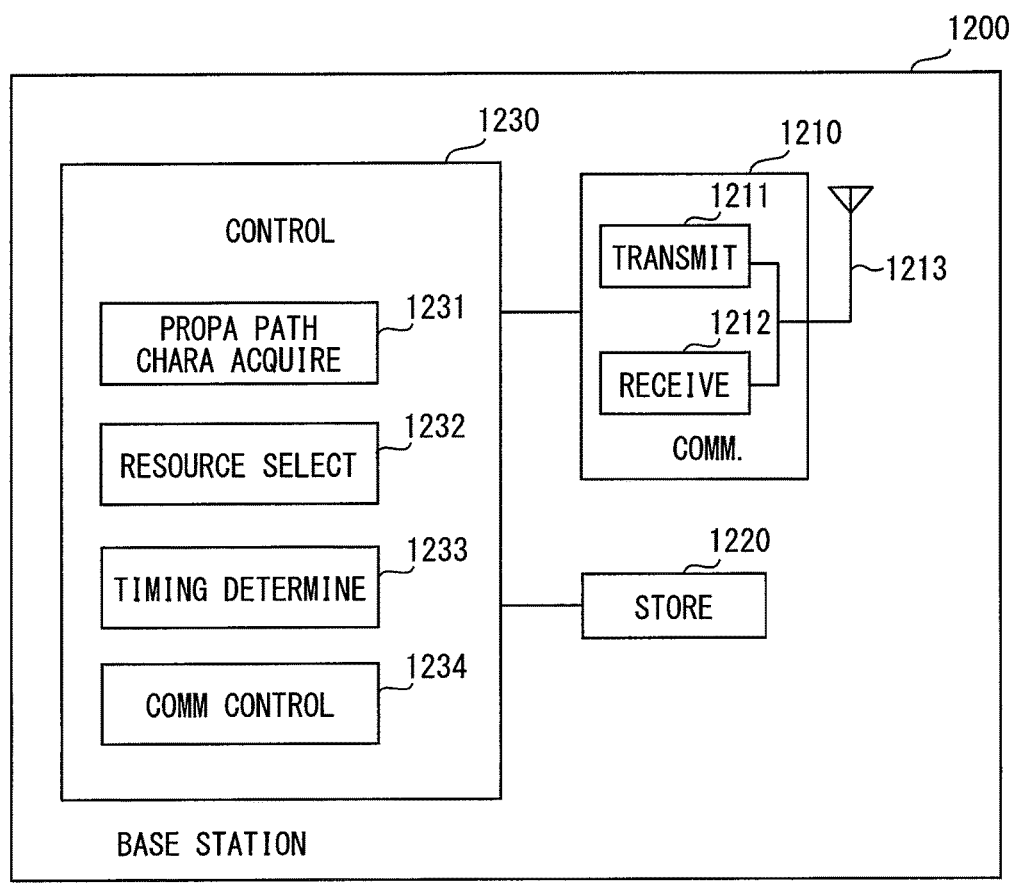
FIG. 12 is a block diagram illustrating a configuration of a base station in FIG. 9.

The base station 1200 has the same hardware configuration as the base station 200 in the first embodiment. Specifically, the base station 1200 includes the same hardware as the base station 200 according to the first embodiment, namely, a communicator 1210, a storage unit 1220, and a control circuit 1230, as in FIG. 12. Thus, a transmitter 1211, a receiver 1212, and an antenna 1213, which are included in the communicator 1210, are identical with the transmitter 211, receiver 212, and antenna 213 included in the communicator 210 in FIG. 2.

The control circuit 1230 differs in functionality from the control circuit 230 in FIG. 2. As in FIG. 12, the control circuit 1230 includes, as its functions, a propagation path characteristics acquirer section 1231, a resource selector section 1232, a timing determiner section 1233, and a communication controller section 1234.

The propagation path characteristics acquirer section 1231 acquires from the receiver 1212 the front antenna propagation path characteristics information CCA and rear antenna propagation path characteristics information CCB that are transmitted from the reception information transmitter section 1332 of the in-vehicle terminal 1300 and received by the receiver 1212. Such information is supposed to be received when the in-vehicle terminal 1300 is at a reception position (i.e., at a communication position). Namely, the front antenna propagation path characteristics information CCA and the rear antenna propagation path characteristics information CCB are associated with the position where the information is received.

The resource selector section 1232 regards the position where the reference signal R is received by the front antenna 1371 as the communication position, and determines the resource to be used for communication at the communication position based on the front antenna propagation path characteristics information CCA acquired by the propagation path characteristics acquirer section 1231.

The resource selector section 1232 further determines the resource for a rear time post-period. The rear time post-period is a period that is subsequent to a rear communication time determined by the timing determiner section 1233 and is a predicted period of time required for the rear antenna 1372 to reach the position of the front antenna 1371 at the rear communication time.

The movement speed of the in-vehicle terminal 1300 is used to determine the rear communication time. The time of transmission of the reference signal R corresponding to the front antenna propagation path characteristics information CCA acquired together with the movement speed is referred to as the front communication time. The front communication time is time t1 in FIGS. 13 and 14. The rear communication time is time t2 in FIGS. 13 and 14. An example of the rear time post-period is time t3 in FIGS. 13 and 14.

During the rear time post-period, it can be estimated that the propagation path characteristics information CC is between the front antenna propagation path characteristics information CCA acquired by the propagation path characteristics acquirer section 1231 at the front communication time and the front antenna propagation path characteristics information CCA acquired by the propagation path characteristics acquirer section 1231 at the rear communication time. The resource for the rear time post-period is determined based on the estimable propagation path characteristics information CC.

Based on the movement speed of the in-vehicle terminal 1300, which is received by the receiver 1212, the timing determiner section 1233 determines the time at which the rear antenna 1372 is placed at the position where the reference signal R is received by the front antenna 1371 (i.e., the aforementioned communication position). The determined time is the aforementioned rear communication time.

The communication controller section 1234 periodically transmits the aforementioned reference signal R from the transmitter 211. Further, at the rear communication time determined by the timing determiner section 1233, the communication controller section 1234 communicates with the in-vehicle terminal 1300 by using the resource that is selected by the resource selector section 1232 as the resource for use at the rear communication time. The communication here is, specifically, a transmission so that a predetermined signal is transmitted by using the selected resource. Furthermore, in addition to the predetermined signal, the reference signal R is transmitted by using all the subchannels. The communication controller section 1234 corresponds to a target apparatus communication controller section.

Moreover, during the rear time post-period, the communication controller section 1234 communicates with the in-vehicle terminal 1300 by using the resource that is selected by the resource selector section 1232 as the resource for use during the rear time post-period.

[Exemplary Communication in Fourth Embodiment]

Figure 13:
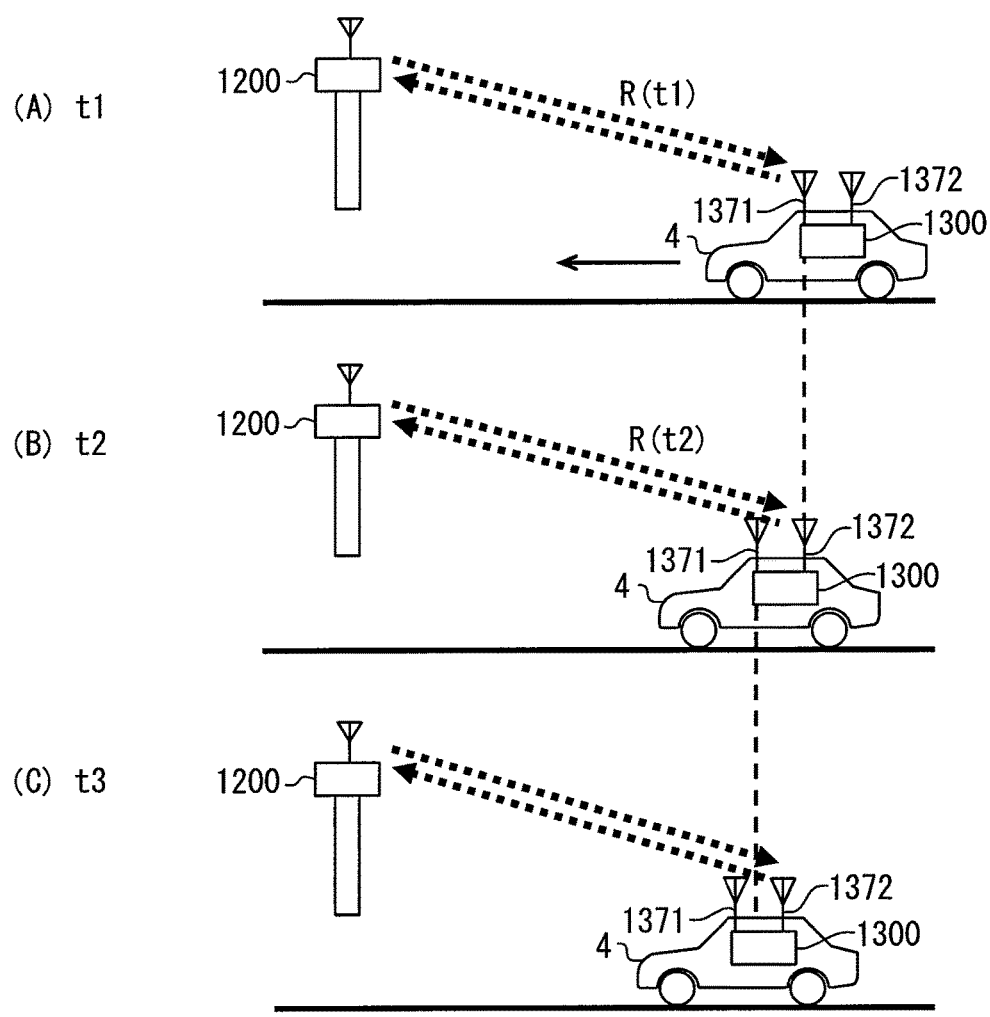
FIG. 13 is a diagram illustrating how communication is established by the mobile communication system according to the fourth embodiment.

At time t1 in FIG. 13 (A), the base station 1200 transmits the reference signal R (t1), and the in-vehicle terminal 1300 receives that reference signal R (t1). After time t1, the characteristics information determiner section 1331 of the in-vehicle terminal 1300 acquires the reference signal R (t1) received by the front antenna 1371 and determines the front antenna propagation path characteristics information CCA. Next, before time t2, the reception information transmitter section 1332 transmits the front antenna propagation path characteristics information CCA, the movement speed, and the ID of the in-vehicle terminal 1300 to the base station 1200. The propagation path characteristics acquirer section 1231 of the base station 1200 acquires these informations, such as the front antenna propagation path characteristics information CCA, from the receiver 1212.

Figure 14:
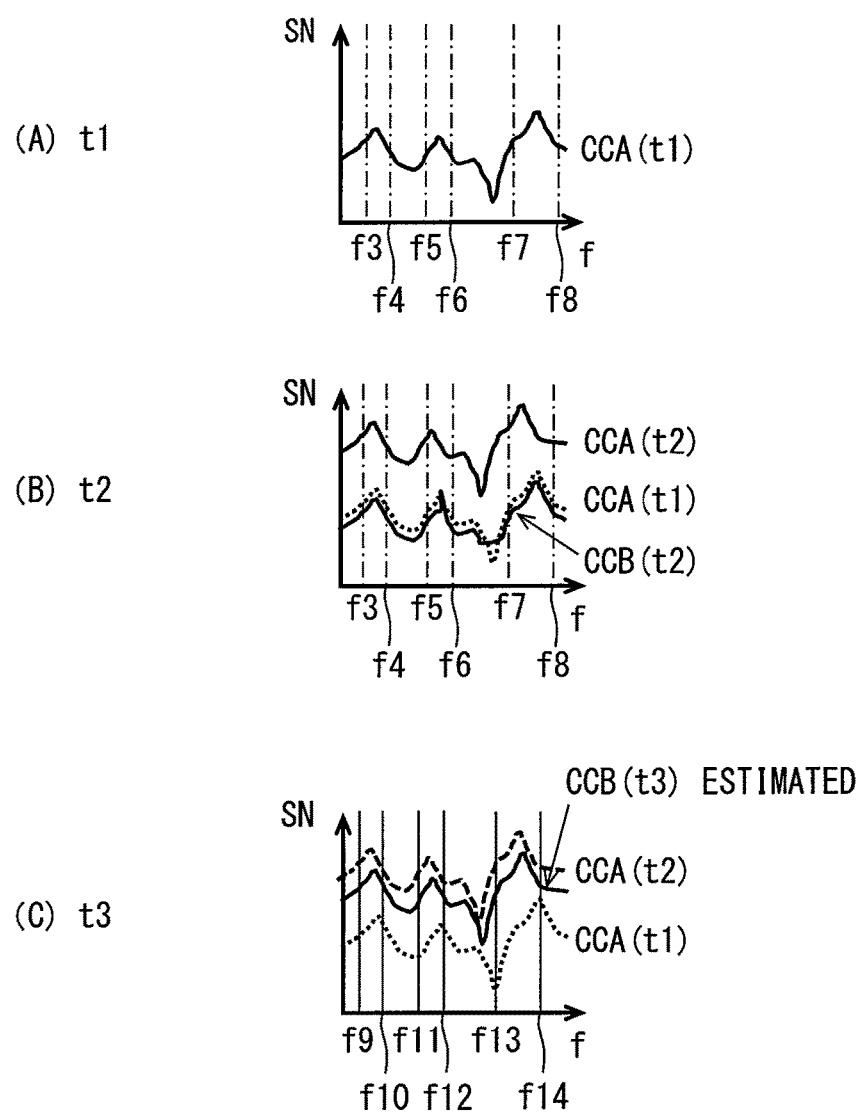
FIG. 14 is a diagram illustrating propagation path characteristics information determined by a characteristics information determiner section in FIG. 11.

FIG. 14 (A) illustrates the front antenna propagation path characteristics information CCA that is acquired by the propagation path characteristics acquirer section 1231 in the state in FIG. 13 (A). The front antenna propagation path characteristics information CCA in FIG. 14 (A) is depicted with the horizontal axis representing the frequency and the vertical axis representing the signal-to-noise ratio. The front antenna propagation path characteristics information CCA in FIG. 14 (A) exhibits the signal-to-noise ratio varying with the frequency.

Thus the resource selector section 1232 of the base station 1200 selects a frequency channel having a good signal-to-noise ratio as the resource for use at the communication position. In FIG. 14 (A), frequencies f3-f4, f5-f6, and f7-f8 form frequency bands having a good signal-to-noise ratio;

the resource selector section 1232 selects a frequency channel using such frequency bands as the resource for use at the communication position.

The timing determiner section 1233 determines the rear communication time based on the movement speed of the in-vehicle terminal 1300. The rear communication time is the time at which the rear antenna 1372 is placed at the communication position of the front antenna 1371. The rear communication time is determined by adding the time calculated by dividing the distance between the front antenna 1371 and the rear antenna 1372 by the movement speed of the in-vehicle terminal 1300 to the time of transmission of the reference signal R corresponding to the front antenna propagation path characteristics information CCA.

At the rear communication time, the base station 1200 communicates with the in-vehicle terminal 1300. Time t2 in FIG. 14 (B) is the rear communication time. At time t2, the communication controller section 1234 transmits the reference signal R. The characteristics information determiner section 1331 and reception information transmitter section 1332 of the control circuit 1330 in the in-vehicle terminal 1300 are used to determine, for example, the front antenna propagation path characteristics information CCA and the rear antenna propagation path characteristics information CCB and transmit the determined information from the transmitter 1311 to the base station 1200.

Referring to FIG. 14 (B), the front antenna propagation path characteristics information CCA (t1) indicated by a dotted line is the front antenna propagation path characteristics information CCA at time t1. Further, the front antenna propagation path characteristics information CCA (t2) indicated by a solid line is the front antenna propagation path characteristics information CCA at time t2. Furthermore, the rear antenna propagation path characteristics information CCB (t2) indicated by another solid line is the rear antenna propagation path characteristics information CCB at time t2.

The rear antenna propagation path characteristics information CCB (t2) in FIG. 14 (B) is the propagation path characteristics information CC that is determined by allowing the rear antenna 1372 to receive the reference signal R at a position where the reference signal R is received by the front antenna 1371. Therefore, the rear antenna propagation path characteristics information CCB (t2) is similar to the front antenna propagation path characteristics information CCA (t1). This signifies that communication is established at a good signal-to-noise ratio when the base station 1200 communicates at time t2 with the in-vehicle terminal 1300 by using the resource selected by the resource selector section 1232.

Further, the resource selector section 1232 determines the resource to be used during the aforementioned rear time post-period. As mentioned, the rear time post-period is a period subsequent to the rear communication time and is a predicted period of time required for the rear antenna 1372 to reach the position of the front antenna 1371 at the rear communication time. FIG. 13 (C) illustrates the position of the in-vehicle terminal 1300 during the rear time post-period.

The position of the rear antenna 1372 in FIG. 13 (C) is intermediate between the position of the front antenna 1371 at time t1 in FIG. 13 (A) and the position of the front antenna 1371 at time t2 in FIG. 13 (B). Therefore, as indicated in FIG. 14 (C), an estimated value of the rear antenna propagation path characteristics information CCB (t3) at time t3 would be intermediate between the front antenna propagation path characteristics information CCA (t1) at time t1 and the front antenna propagation path characteristics information CCA (t2) at time t2. The rear antenna propagation path characteristics information CCB (t3) in FIG. 13 (C) can be obtained by determining the weighted average of the front antenna propagation path characteristics information CCA (t1) and the front antenna propagation path characteristics information CCA (t2) based on the ratio between the distance from the position of the front antenna 1371 at time t1 to the position of the rear antenna 1372 at time t3 and the distance from the position of the rear antenna 1372 at time t3 to the position of the front antenna 1371 at time t2. Alternatively, depending on the required accuracy, the simple average of the front antenna propagation path characteristics information CCA (t1) and the front antenna propagation path characteristics information CCA (t2) may be determined, instead of the weighted average, to obtain the rear antenna propagation path characteristics information CCB (t3).

Based on the above-described rear antenna propagation path characteristics information CCB about the rear time post-period, the resource selector section 1232 determines the resource for use during the rear time post-period. In FIG. 14 (C), the estimated value of the rear antenna propagation path characteristics information CCB (t3) indicates that frequencies f9-f10, f11-f12, and f13-f14 form frequency bands having a good signal-to-noise ratio. Therefore, the resource selector section 1232 selects a frequency channel using such frequency bands as the resource for use at time t3.

The communication controller section 1234 then uses the selected resource at time t3 to communicate with the in-vehicle terminal 1300 by transmitting a signal including the ID of the in-vehicle terminal 1300. This establishes communication at a good signal-to-noise ratio even at time t3.

Fifth Embodiment

The mobile communication system according to a fifth embodiment has the same hardware configuration as the mobile communication system according to the fourth embodiment. The control circuit 1330 of the in-vehicle terminal 1300 in the fifth embodiment includes the characteristics information determiner section 1331 and the reception information transmitter section 1332, as is the case with the control circuit in the fourth embodiment.

In the fifth embodiment, the reception information transmitter section 1332 transmits to the base station 1200 not only various information transmitted in the fourth embodiment, but also the current position at which the reference signal R is received. In the fifth embodiment, therefore, the reception information transmitter section 1332 further transmits, from the transmitter 1311 to the base station 1200, the front antenna propagation path characteristics information CCA and the rear antenna propagation path characteristics information CCB, which are respectively determined from the reference signal R received at the front communication time and the reference signal R received at the rear communication time, in addition to the movement speed of the in-vehicle terminal 1300 at the time of reception of the reference signal R, the distance between the front antenna 1371 and the rear antenna 1372, and the ID of the in-vehicle terminal 1300.

Figure 15:
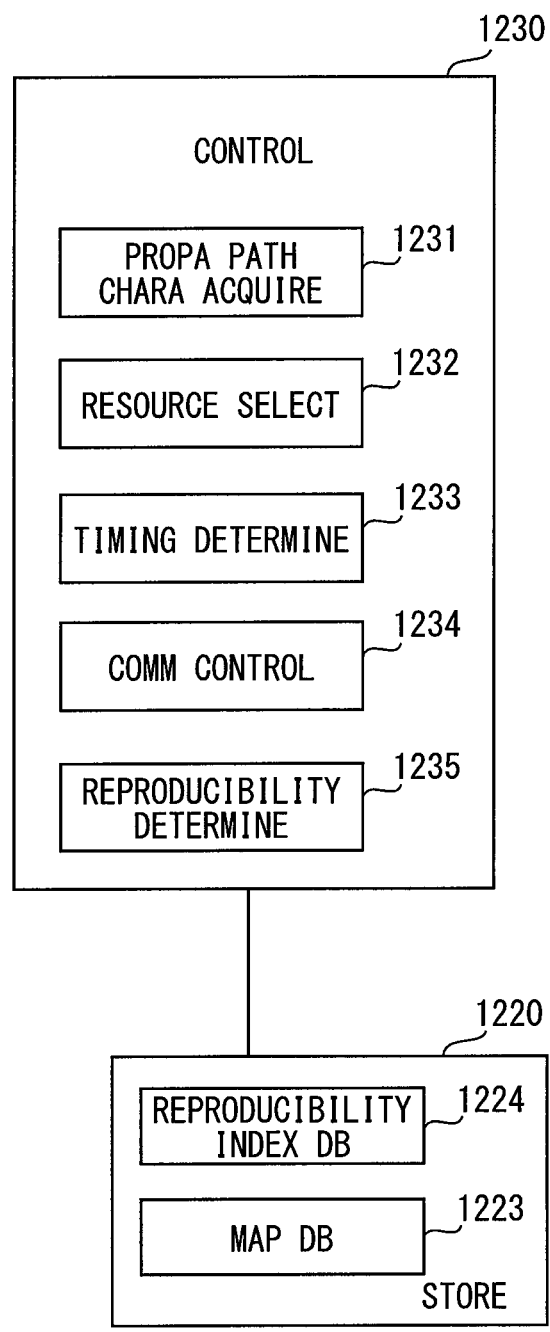
FIG. 15 is a block diagram illustrating the functions of a control circuit in the base station in accordance with a fifth embodiment.

As in FIG. 15, the storage unit 1220 of the base station 1200 includes a reproducibility index database 1224. Further, the control circuit 1230 additionally includes a reproducibility determiner section 1235 as in FIG. 15. Elements not depicted in FIG. 15 are identical with the elements in the base station 1200 according to the fourth embodiment.

Namely, the elements identical with the elements in the base station 1200 according to the fourth embodiment are omitted from FIG. 15.

The reproducibility index database 1224 associates a point (i.e., spot) with the reproducibility index determined by the later-described reproducibility determiner section 1235.

The reproducibility determiner section 1235 compares the front antenna propagation path characteristics information CCA with the rear antenna propagation path characteristics information CCB, which is determined from the reference signal R transmitted from the base station 1200 at the rear communication time, and determines the reproducibility index indicative of reproducibility of the propagation path characteristics information CC. The reproducibility index may be calculated as follows. The reproducibility index is calculated by determining at each frequency the absolute value of the difference between the signal-to-noise ratio indicated by the front antenna propagation path characteristics information CCA and the signal-to-noise ratio indicated by the rear antenna propagation path characteristics information CCB. The greater the integrated value of the absolute value of the difference, the lower the reproducibility indicated by the reproducibility index. Further, the reproducibility determiner section 1235 associates the calculated reproducibility index with a communication position and updates the reproducibility index database 1224 based on the reproducibility index and the communication position.

Further, in the fifth embodiment, the communication controller section 1234 determines the position of communication at the rear communication time or during the rear time post-period from the current position and movement speed of the in-vehicle terminal 1300, which are acquired at the front communication time. Then, based on the determined position of communication and on the reproducibility index database 1224, the communication controller section 1234 determines a parameter setting on the reliability of communication at the rear communication time or during the rear time post-period and communicates with the in-vehicle terminal 1300.

A parameter of reliability is, for example, a code rate. The lower the code rate (i.e., the higher the redundancy), the higher the reliability of communication. Therefore, when the reproducibility index indicates low reproducibility, the code rate is lowered. Another parameter of reliability is a modulation rate. The higher the modulation rate, the lower the reliability of communication. Therefore, when the reproducibility index indicates low reproducibility, the modulation rate is lowered.

The fifth embodiment thus improves the reliability of communication at the rear communication time or during the rear time post-period.

Sixth Embodiment

Figure 16:
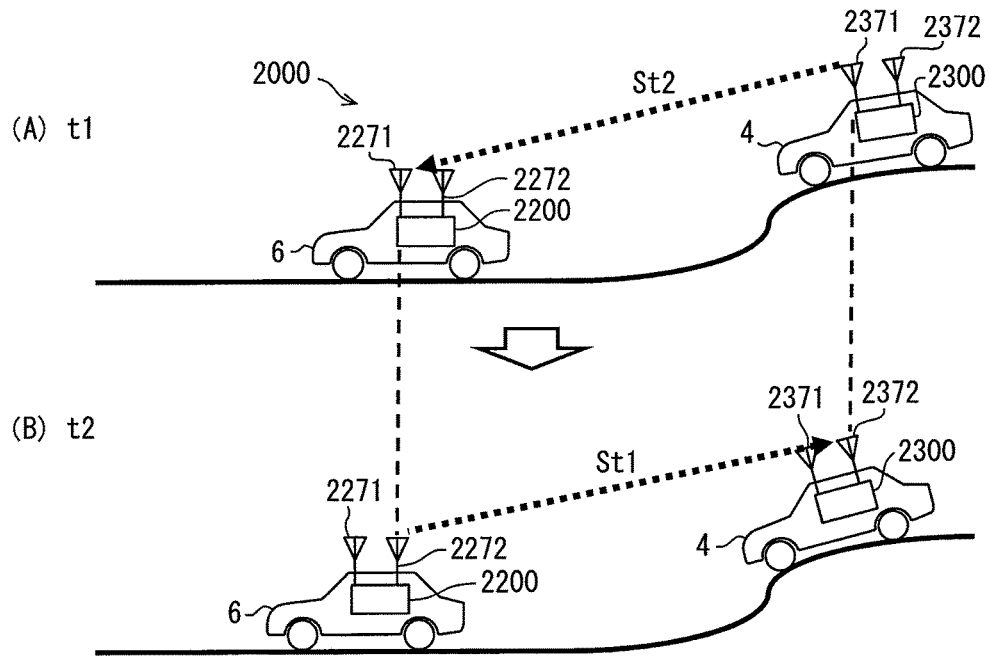
FIG. 16 is a diagram illustrating a configuration of a mobile communication system according to a sixth embodiment.

As in FIG. 16, a mobile communication system 2000 according to a sixth embodiment includes a first in-vehicle terminal 2200 and a second in-vehicle terminal 2300. The first in-vehicle terminal 2200 is mounted in a vehicle 6; the second in-vehicle terminal 2300 is mounted in a vehicle 4. The mobile communication system 2000 may include a plurality of first in-vehicle terminals 2200 and a plurality of second in-vehicle terminals 2300. The vehicle 6 corresponds to a first mobile object, while the first in-vehicle terminal 2200 mounted in the vehicle 6 corresponds to the target communication apparatus. The vehicle 4 corresponds to a second mobile object, while the second in-vehicle terminal 2300 mounted in the vehicle 4 corresponds to the mobile communication apparatus.

Figure 17:
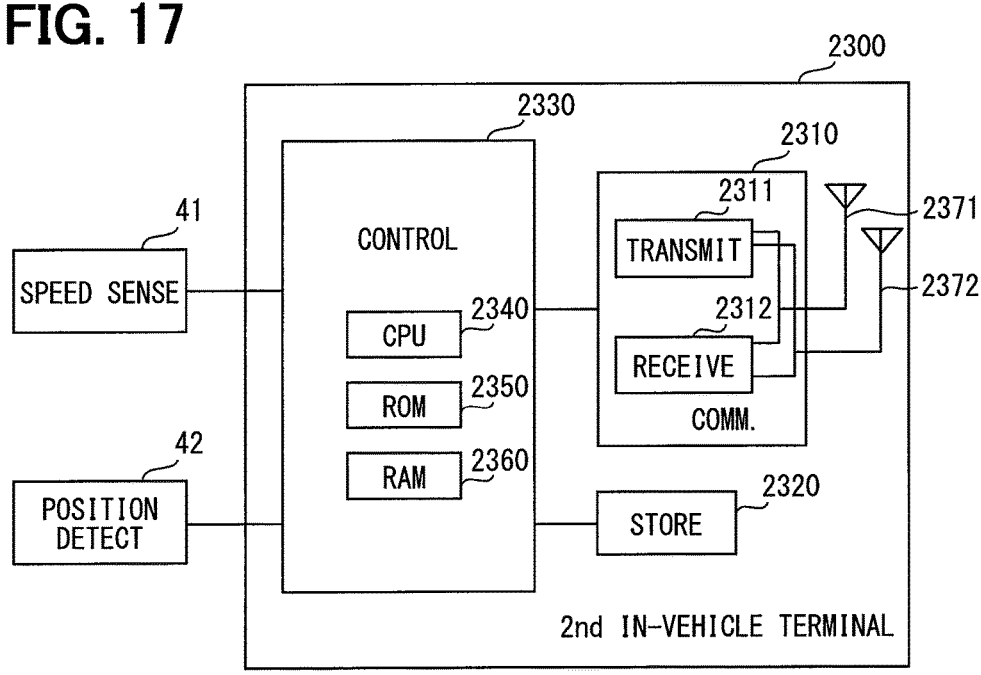
FIG. 17 is a block diagram illustrating a configuration of a second in-vehicle terminal in FIG. 16.

First, a configuration of the second in-vehicle terminal 2300 will be described. Obviously from FIG. 17, the second in-vehicle terminal 2300 has the same hardware configuration as the in-vehicle terminal 1300 according to the fourth embodiment.

Thus a communicator 2310 includes a transmitter 2311, a receiver 2312, a front antenna 2371, and a rear antenna 2372. These elements have the same configurations as the transmitter 1311, receiver 1312, front antenna 1371, and rear antenna 1372 included in the communicator 1310 in FIG. 10. Like the front antenna 1371 and the rear antenna 1372, the front antenna 2371 and the rear antenna 2372 are mounted on the roof of the vehicle 4 with a front-rear relation (i.e., longitudinally disposed in the travel direction of the vehicle 4), and positioned at the same height. In the sixth embodiment, the front antenna 2371 functions as the reference antenna; the rear antenna 2372 functions as the selected resource antenna.

Further, a storage unit 2320 is identical with the storage unit 1320 in FIG. 10. A control circuit 2330 includes a CPU 2340, a ROM 2350, and a RAM 2360. Signals from the speed sensor 41 and the position detector 42 are inputted to the control circuit 2330.

Figure 18:
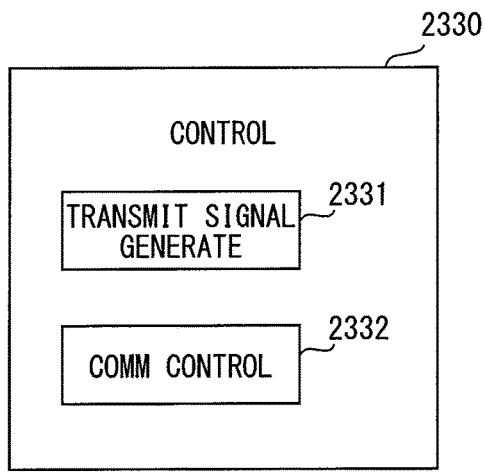
FIG. 18 is a block diagram illustrating the functions of a control circuit in FIG. 17.

As in FIG. 18, the control circuit 2330 includes functions different from those of the control circuit 1330 in FIG. 10. Specifically, the control circuit 2330 includes, as its functions, an outgoing signal generator section 2331 and a communication controller section 2332.

The outgoing signal generator section 2331 periodically generates a second terminal signal St2, which is transmitted from the transmitter 2311. The second terminal signal St2 includes the reference signal R, a signal indicative of the movement speed of the second in-vehicle terminal 2300, and a signal indicative of an inter-antenna distance. The movement speed of the second in-vehicle terminal 2300 is a speed that is acquired from the speed sensor 41. The inter-antenna distance is the distance between the front antenna 2371 and the rear antenna 2372. If the first in-vehicle terminal 2200 stores the inter-antenna distance beforehand, the second terminal signal St2 does not need to include the inter-antenna distance.

The communication controller section 2332 controls the transmitter 2311 so as to let the front antenna 2371 transmit the second terminal signal St2 generated by the outgoing signal generator section 2331. Time t1 in FIG. 16 (A) is the time of such signal transmission. Upon receipt of the second terminal signal St2, the first in-vehicle terminal 2200 transmits a first terminal signal St1 to the second in-vehicle terminal 2300 by using a resource determined based on the reference signal R included in the second terminal signal St2. The communication controller section 2332 controls the receiver 2312 so as to let the rear antenna 2372 receive the first terminal signal St1.

Figure 19:
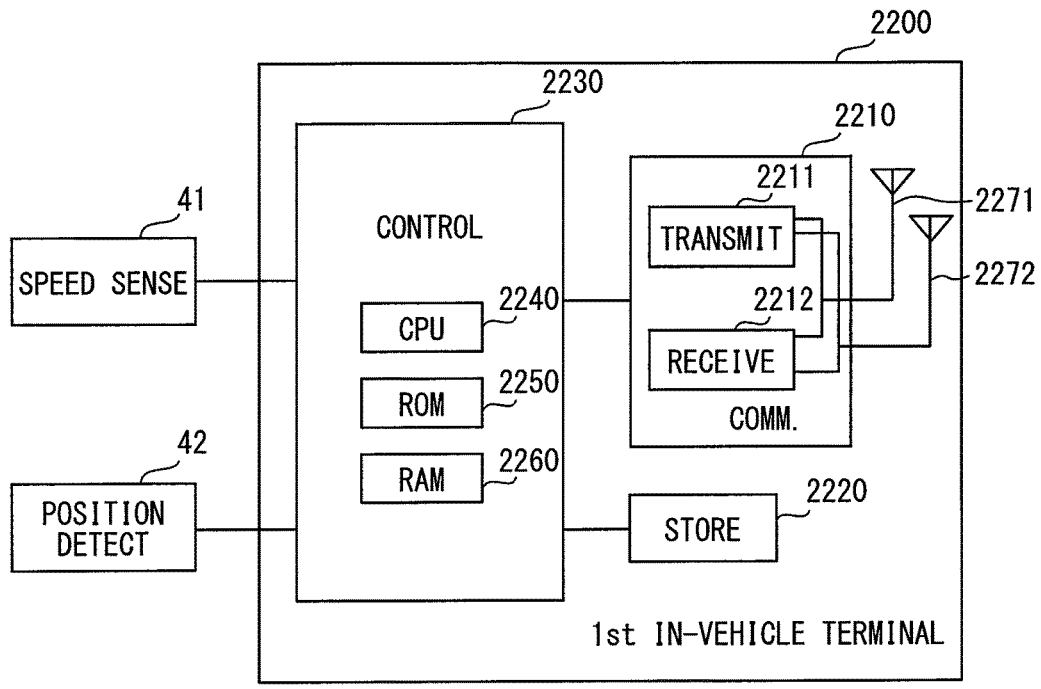
FIG. 19 is a block diagram illustrating a configuration of a first in-vehicle terminal in FIG. 16.

A configuration of the first in-vehicle terminal 2200 will be described. Obviously from FIG. 19, the first in-vehicle terminal 2200 has the same hardware configuration as the second in-vehicle terminal 2300. Specifically, the first in-vehicle terminal 2200 includes a communicator 2210, a storage unit 2220, and a control circuit 2230. These elements have the same configurations as the communicator 2310, storage unit 2320, and control circuit 2330 in the second in-vehicle terminal 2300.

The communicator 2210 includes a transmitter 2211, a receiver 2212, a target apparatus front antenna 2271, and a target apparatus rear antenna 2272. These elements have the same configurations as the transmitter 2311, receiver 2312, front antenna 2371, and rear antenna 2372 included in the communicator 2310 of the second in-vehicle terminal 2300. The target apparatus front antenna 2271 and the target apparatus rear antenna 2272 are mounted on the roof of the vehicle 6, longitudinally disposed in the travel direction of the vehicle 6, and positioned at the same height. The distance between the target apparatus front antenna 2271 and the target apparatus rear antenna 2272 is the same as the distance between the front antenna 2371 and the rear antenna 2372.

The control circuit 2230 includes a CPU 2240, a ROM 2250, and a RAM 2260. Signals from the speed sensor 41 and the position detector 42 are inputted to the control circuit 2230.

Figure 20:
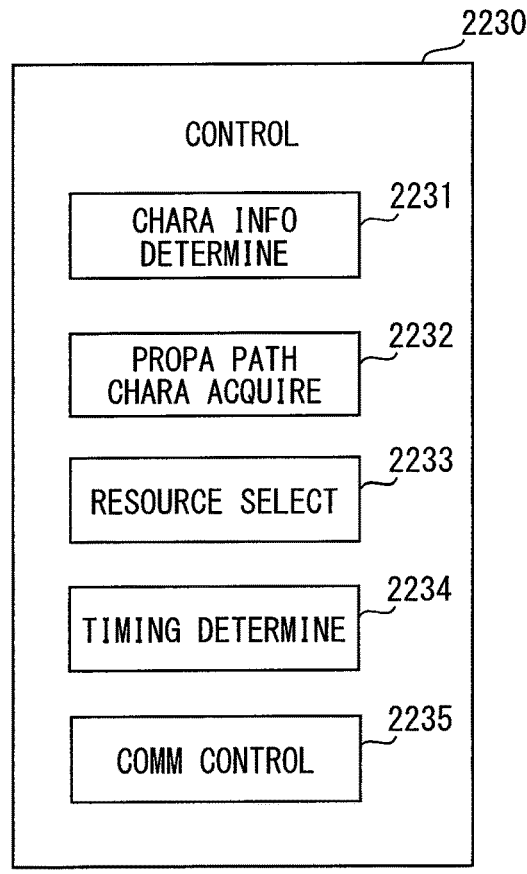
FIG. 20 is a block diagram illustrating the functions of a control circuit in FIG. 19.

The control circuit 2230 has functions in FIG. 20. Specifically, the control circuit 2230 includes, as its functions, a characteristics information determiner section 2231, a propagation path characteristics acquirer section 2232, a resource selector section 2233, a timing determiner section 2234, and a communication controller section 2235.

As mentioned, the second in-vehicle terminal 2300 transmits the second terminal signal St2. When the second terminal signal St2 is received by the target apparatus front antenna 2271, the characteristics information determiner section 2231 assumes that the second in-vehicle terminal 2300 is in the communication position at the time of reception, that is, at the time of transmission from the second in-vehicle terminal 2300.

Figure 21:
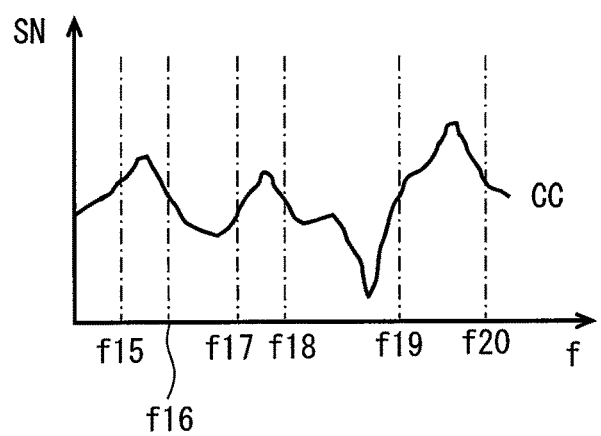
FIG. 21 is a diagram illustrating the propagation path characteristics information determined by a characteristics information determiner section in FIG. 20.

Further, the characteristics information determiner section 2231 determines the propagation path characteristics information CC based on the reference signal R included in the received second terminal signal St2. The determined propagation path characteristics information CC is then stored in the storage unit 2220. In the embodiment, the storage unit 2220 stores the propagation path characteristics information CC. Alternatively, a different storage unit may be designated to store the propagation path characteristics information CC. FIG. 21 illustrates the propagation path characteristics information CC determined by the characteristics information determiner section 2231.

The propagation path characteristics acquirer section 2232 acquires the propagation path characteristics information CC from the storage unit 2220. The resource selector section 2233 selects a resource for use in communication at the communication position determined by the characteristics information determiner section 2231 based on the propagation path characteristics information CC acquired by the propagation path characteristics acquirer section 2232. The meaning of the resource and the method of resource selection are the same as described in conjunction with the resource selector section 235 in the first embodiment. When a frequency resource to be used for communication is to be selected based on the propagation path characteristics information CC illustrated in FIG. 21, frequencies f15-f16, f17-f18, and f19-f20 form frequency bands having a good signal-to-noise ratio as indicated in FIG. 21. Therefore, the resource selector section 2233 selects a frequency channel using such frequency bands as the resource for use at the communication position.

The timing determiner section 2234 predicts the time at which the rear antenna 2372 attached to the second in-vehicle terminal 2300 is placed at a position where the second terminal signal St2 is transmitted from the front antenna 2371, that is, at the communication position determined by the characteristics information determiner section 2231. The time to be predicted can be calculated by adding a value obtained by dividing the inter-antenna distance between the rear antenna 2372 and the front antenna 2371 by the movement speed to the time of reception of the second terminal signal St2.

At the time determined by the timing determiner section 2234, the communication controller section 2235 transmits the first terminal signal St1 to the second in-vehicle terminal 2300 by using the resource selected by the resource selector section 2233 from either the target apparatus front antenna 2271 or the target apparatus rear antenna 2272, whichever is closer to the position of the target apparatus front antenna 2271 at the time of reception of the second terminal signal St2. The contents of the first terminal signal St1 are not particularly limited. As mentioned, the second in-vehicle terminal 2300 uses the rear antenna 2372 to receive the first terminal signal St1.

The communication controller section 2235 transmits a signal at the above-mentioned time on transmission condition that the second in-vehicle terminal 2300 and the first in-vehicle terminal 2200 be equal in movement speed. The reason is that the communication environment for the second terminal signal St2 is not similar to the communication environment for the first terminal signal St1 if the second in-vehicle terminal 2300 and the first in-vehicle terminal 2200 are not equal in movement speed. Further, conditions of being equal in travel direction and of traveling on the same road may be imposed in addition to the condition of being equal in movement speed.

The movement speed of the second in-vehicle terminal 2300 is included in the second terminal signal St2, and the movement speed of the first in-vehicle terminal 2200 is determined from a signal of the speed sensor 41 mounted in the vehicle 6. Obviously, the condition of being equal in movement speed includes the condition of being substantially equal in movement speed. The degree of tolerable difference in the movement speed is set as appropriate.

If the above transmission condition is not established and the movement speed of the second in-vehicle terminal 2300 or first in-vehicle terminal 2200 is zero or low and close to zero, a terminal exhibiting a movement speed of zero or close to zero can be handled in the same manner as the base station 1200. Therefore, if the transmission condition is not established and the movement speed of the second in-vehicle terminal 2300 or first in-vehicle terminal 2200 is zero or low and close to zero, the timing determiner section 2234 and the communication controller section 2235 provide the same control as the timing determiner section 1233 and communication controller section 1234 according to the fourth embodiment.

Time t2 in FIG. 16 (B) is the time determined by the timing determiner section 2234. In FIG. 16 (B), a signal is transmitted from the target apparatus rear antenna 2272. Obviously from the comparison between FIG. 16 (A) and FIG. 16 (B), the position of the front antenna 2371 when the second terminal signal St2 is communicated is the same as the position of the rear antenna 2372 when the first terminal signal St1 is communicated. Further, the position of the target apparatus front antenna 2271 when the second terminal signal St2 is communicated is the same as the position of the target apparatus rear antenna 2272 when the first terminal signal St1 is communicated. Therefore, the communication environment for the second terminal signal St2 is very similar to the communication environment for the first terminal signal St1. Consequently, the first terminal signal St1 can be properly communicated by using a resource that is selected based on the propagation path characteristics information CC determined from the reference signal R included in the second terminal signal St2.

FIG. 16 (B) depicts an easy-to-understand example in which the positions of two antennas 2271, 2371 for the communication of the second terminal signal St2 are the same as the positions of two antennas 2272, 2372 for the communication of the first terminal signal St1.

However, signals are generally transmitted at discrete time intervals. Therefore, the communication controller section 2235 may fail to transmit the first terminal signal St1 at an exact time determined by the timing determiner section 2234. The "time determined by the timing determiner section 2234", which is mentioned earlier to describe the communication controller section 2235, denotes a time that permits a signal transmission and is closest to the time determined by the timing determiner section 2234.

The time determined by the timing determiner section 2234 does not always coincide with a time that permits a signal transmission. Therefore, at the time that permits a signal transmission, the target apparatus front antenna 2271 may be closer to the position of the target apparatus front antenna 2271 at the time of reception of the second terminal signal St2 than the target apparatus rear antenna 2272. Thus, the communication controller section 2235 transmits the first terminal signal St1 from either the target apparatus front antenna 2271 or the target apparatus rear antenna 2272, whichever is closer to the position of the target apparatus front antenna 2271 at the time of reception of the second terminal signal St2.

For convenience of explanation, the sixth embodiment has been described on the assumption that the control circuit 2230 of the first in-vehicle terminal 2200 differs in functionality from the control circuit 2330 of the second in-vehicle terminal 2300. Alternatively, both of the control circuits 2230, 2330 may incorporate all the functions in FIGS. 18 and 20. In such an alternative configuration, the functions of the control circuit 2330 in the second in-vehicle terminal 2300 should be executed if the second terminal signal St2 is not received, and the functions of the control circuit 2230 in the first in-vehicle terminal 2200 should be executed if the second terminal signal St2 is received.

Seventh Embodiment

Figure 22:
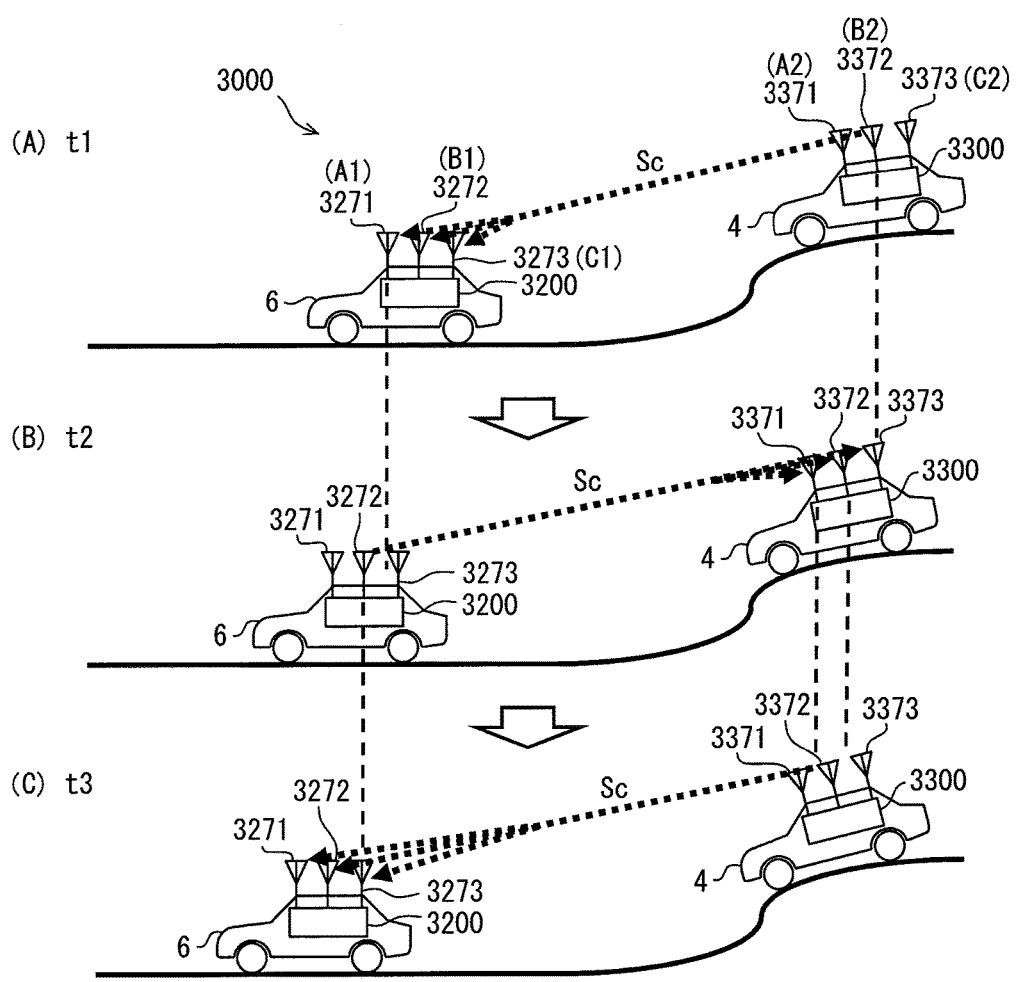
FIG. 22 is a diagram illustrating a configuration of a mobile communication system according to a seventh embodiment.

As in FIG. 22, a mobile communication system 3000 according to a seventh embodiment includes a first in-vehicle terminal 3200 and a second in-vehicle terminal 3300. The first in-vehicle terminal 3200 is mounted in the vehicle 4, and the second in-vehicle terminal 3300 is mounted in the vehicle 6. The mobile communication system 3000 may include a plurality of first in-vehicle terminals 3200 and a plurality of second in-vehicle terminals 3300.

The first in-vehicle terminal 3200 includes a first antenna 3271, a second antenna 3272, and a third antenna 3273. These antennas 3271, 3272, 3273 are equal in structure, longitudinally disposed in the travel direction of the vehicle 6, positioned at the same height, and arranged at equal intervals.

The second in-vehicle terminal also includes three antennas, namely, a first antenna 3371, a second antenna 3372, and a third antenna 3373. These antennas 3371, 3372, 3373 are equal in structure to the antennas 3271, 3272, 3273, longitudinally disposed in the travel direction of the vehicle 4, positioned at the same height, and arranged at equal intervals. Further, the antennas 3371, 3372, 3373 are arranged at the same intervals as the antennas 3271, 3272, 3273.

Figure 23:
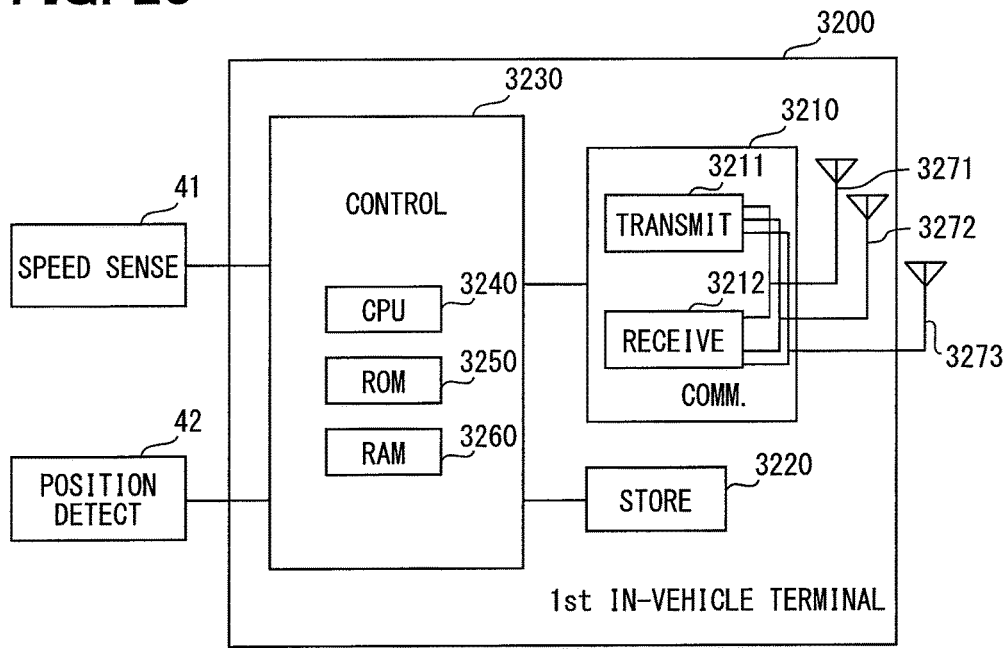
FIG. 23 is a block diagram illustrating a configuration of a first in-vehicle terminal in FIG. 22.

As in FIG. 23, the first in-vehicle terminal 3200 has the same hardware configuration as the first in-vehicle terminal 2200 according to the sixth embodiment except that the former includes three antennas, namely, the first antenna 3271, the second antenna 3272, and the third antenna 3273.

Figure 24:
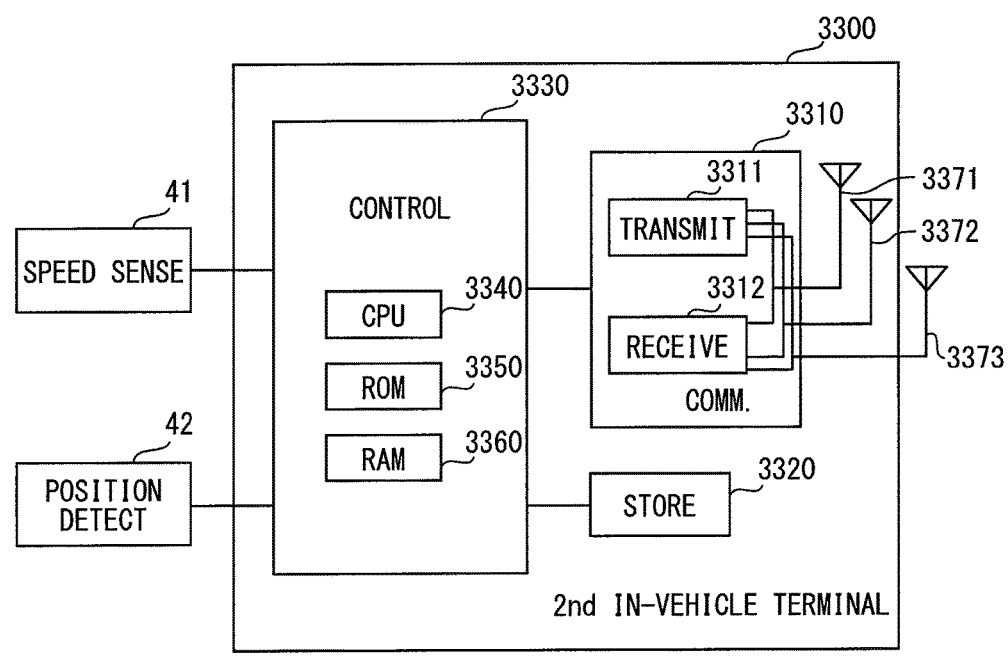
FIG. 24 is a block diagram illustrating a configuration of a second in-vehicle terminal in FIG. 22.

As in FIG. 24, the second in-vehicle terminal 3300 has the same hardware configuration as the second in-vehicle terminal 2300 according to the sixth embodiment except that the former includes three antennas, namely, the first antenna 3371, the second antenna 3372, and the third antenna 3373.

Figure 25:
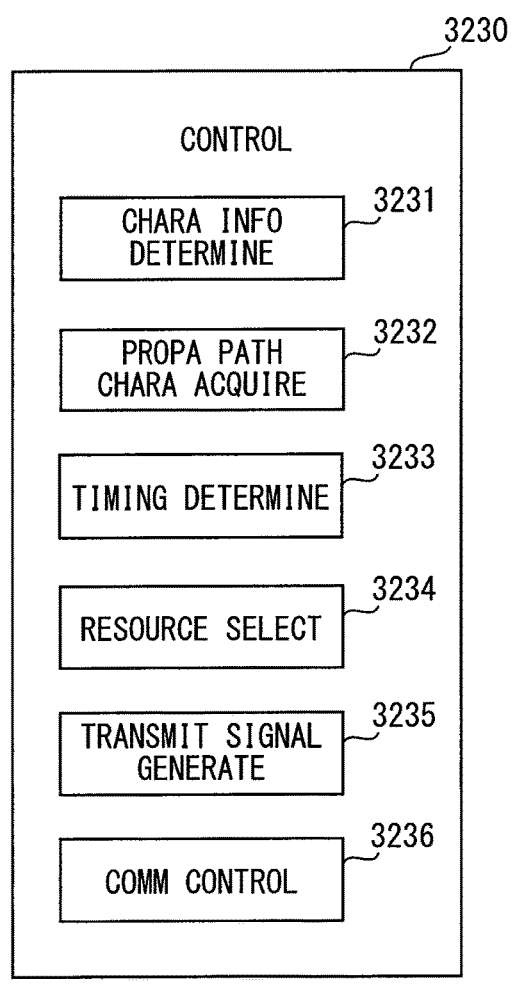
FIG. 25 is a block diagram illustrating the functions of a control circuit in FIG. 23.

A control circuit 3230 of the first in-vehicle terminal 3200 has the same functions as a control circuit 3330 of the second in-vehicle terminal 3300. As in FIG. 25, the control circuit 3230 of the first in-vehicle terminal 3200 includes a characteristics information determiner section 3231, a propagation path characteristics acquirer section 3232, a timing determiner section 3233, a resource selector section 3234, an outgoing signal generator section 3235, and a communication controller section 3236.

Figure 26:
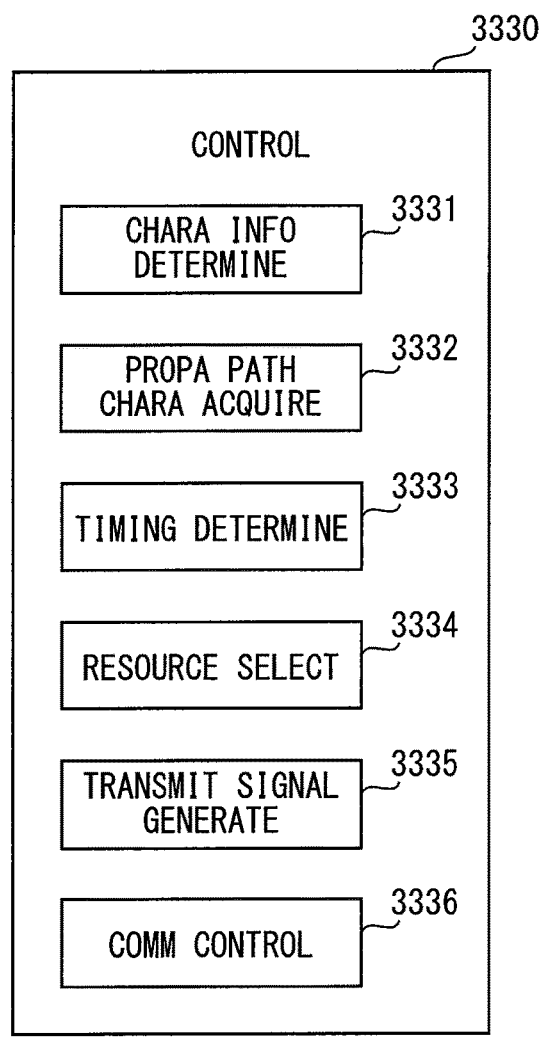
FIG. 26 is a block diagram illustrating the functions of a control circuit in FIG. 24.

As in FIG. 26, the control circuit 3330 of the second in-vehicle terminal 3300 includes a characteristics information determiner section 3331, a propagation path characteristics acquirer section 3332, a timing determiner section 3333, a resource selector section 3334, an outgoing signal generator section 3335, and a communication controller section 3336.

The seventh embodiment alternately gives rise to a state where the first in-vehicle terminal 3200 functions as the target communication apparatus and the second in-vehicle terminal 3300 functions as the mobile communication apparatus and a state where the first in-vehicle terminal 3200 functions as the mobile communication apparatus and the second in-vehicle terminal 3300 functions as the target communication apparatus. In the former state, the vehicle 6 corresponds to the first mobile object, and the vehicle 4 corresponds to the second mobile object. In the latter state, the vehicle 6 corresponds to the second mobile object, and the vehicle 4 corresponds to the first mobile object.

As mentioned, the control circuit 3230 of the first in-vehicle terminal 3200 has the same functions as the control circuit 3330 of the second in-vehicle terminal 3300. The functions of only the control circuit 3230 of the first in-vehicle terminal 3200 will be described in detail.

First of all, the outgoing signal generator section 3235 will be described. The outgoing signal generator section 3235 generates an estimation signal Sc, which is to be transmitted from a transmitter 3311. The estimation signal Sc is similar to the second terminal signal St2 in the sixth embodiment, and includes the reference signal R, a signal indicative of the movement speed of an in-vehicle terminal transmitting the estimation signal Sc (the first in-vehicle terminal 3200 in the embodiment), and a signal indicative of the inter-antenna distance. The inter-antenna distance is the distance between the second antenna 3272 and the third antenna 3273. If the second in-vehicle terminal 3300 stores the inter-antenna distance beforehand, the estimation signal Sc does not need to include the inter-antenna distance. The estimation signal Sc may be transmitted together with various known signals (hereinafter referred to as the main signals) transmitted and received during vehicle-to-vehicle communication. The main signals include signals notifying surrounding vehicles of the behavior of the vehicle 4, such as signals indicative of the acceleration and the current position.

The communication controller section 3236 controls a transmitter 3211 so as to transmit the estimation signal Sc, which is generated by the outgoing signal generator section 3235, from the second antenna 3272. In this instance, the second antenna 3272 functions as the front antenna and as the reference antenna. Meanwhile, when the second antenna 3372 of the second in-vehicle terminal 3300 transmits the estimation signal Sc, the second antenna 3372 functions as the front antenna and as the reference antenna.

FIG. 22 (A) illustrates a state where the outgoing signal generator section 3335 and communication controller section 3336 of the second in-vehicle terminal 3300 perform, at time t1, the same process as the outgoing signal generator section 3235 and the communication controller section 3236 to transmit the estimation signal Sc from the second antenna 3372. The first in-vehicle terminal 3200 receives the estimation signal Sc through the first antenna 3271, the second antenna 3272, and the third antenna 3273. Parenthesized symbols in FIG. 22 correlates to symbols used in FIG. 27 with respect to the antennas.

When the estimation signal Sc is received by the first antenna 3271, the second antenna 3272, and the third antenna 3273, the characteristics information determiner section 3231 assumes that the second in-vehicle terminal 3300 is at the communication position at the time of reception, that is, at the time of transmission from the second in-vehicle terminal 3300.

Further, the characteristics information determiner section 3231 determines the propagation path characteristics information CC based on the reference signal R included in the estimation signal Sc. The determined propagation path characteristics information CC is then stored in a storage unit 3220.

Figure 27:
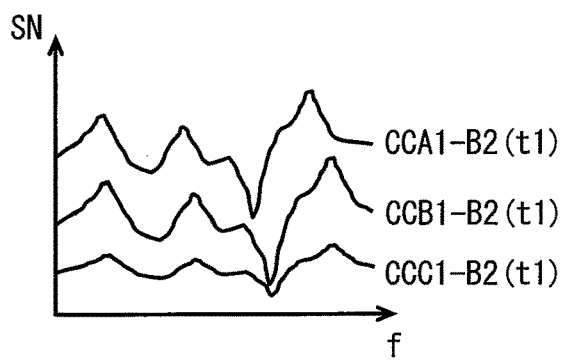
FIG. 27 is a diagram illustrating the propagation path characteristics information CC determined by the characteristics information determiner section in FIG. 26.
Figure 27:
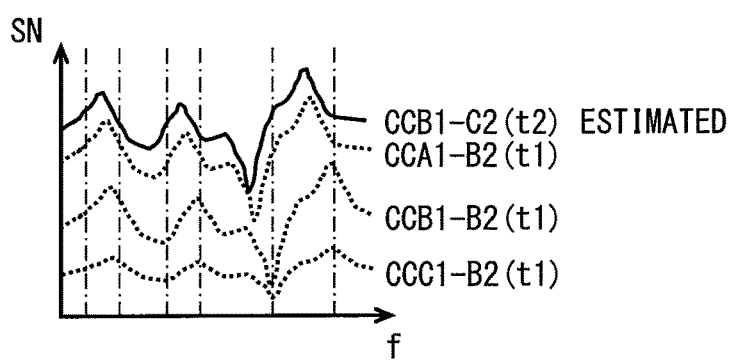
Figure 27:
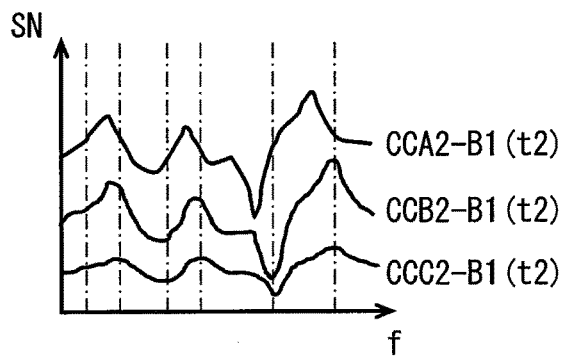
Figure 27:
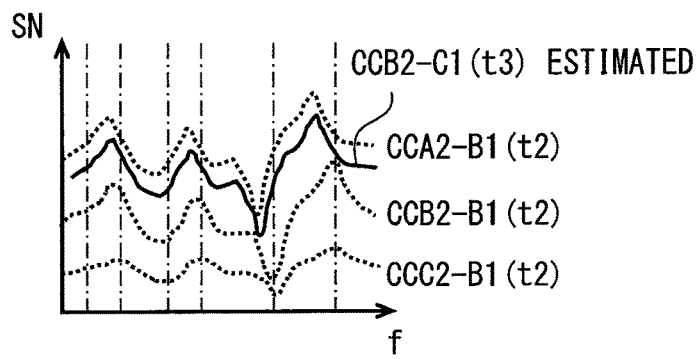

FIG. 27 (A) illustrates the propagation path characteristics information CC determined by the characteristics information determiner section 3231 based on the estimation signal Sc received at time t1. FIG. 27 (A) depicts three propagation path characteristics informations CC. The propagation path characteristics information CCA1-B2 (t1) is propagation path characteristics information CC that is determined by receiving, with the first antenna 3271, the estimation signal Sc transmitted from the second antenna 3372. The propagation path characteristics information CCB1-B2 (t1) is propagation path characteristics information CC that is determined by receiving, with the second antenna 3272, the estimation signal Sc transmitted from the second antenna 3372. The propagation path characteristics information CCC1-B2 (t1) is propagation path characteristics information CC that is determined by receiving, with the third antenna 3273, the estimation signal Sc transmitted from the second antenna 3372.

The propagation path characteristics acquirer section 3232 acquires, from the storage unit 3220, three propagation path characteristics informations CC that are determined by using signals received through the first antenna 3271, the second antenna 3272, and the third antenna 3273.

The timing determiner section 3233 predicts (i.e., determines in advance) the time at which the third antenna 3373 of the second in-vehicle terminal 3300 is placed at a position at which the estimation signal Sc is received by the second antenna 3372, that is, the communication position determined by the characteristics information determiner section 3231. The above time can be calculated by adding a value obtained by dividing the inter-antenna distance between the second antenna 3372 and the third antenna 3373 by the movement speed to the time of reception of the estimation signal Sc.

Based on the three propagation path characteristics informations CC acquired by the propagation path characteristics acquirer section 3232, the resource selector section 3234 selects a resource for communication at the communication position determined by the characteristics information determiner section 3231. The meaning of the resource and the method of resource selection are the same as described in conjunction with the resource selector section 235 in the first embodiment. When selecting a resource, the resource selector section 3234 uses the movement speed included in the estimation signal Sc, the movement speed of the first in-vehicle terminal 3200, and the time determined by the timing determiner section 3333. The difference in speed between the first in-vehicle terminal 3200 and the second in-vehicle terminal 3300 can be calculated from the difference between the two movement speeds. The calculated speed difference is then multiplied by the interval of time between the current time and the time determined by the timing determiner section 3333. This can calculate the amount of change in the distance (hereinafter referred to as the change distance) between the first in-vehicle terminal 3200 and the second in-vehicle terminal 3300 at the time determined by the timing determiner section 3233 relative to the distance between the first in-vehicle terminal 3200 and the second in-vehicle terminal 3300 at the time of communication of the estimation signal Sc.

Consequently, it can be estimated that, at the time determined by the timing determiner section 3233, the second antenna 3272 will be placed at a position shifted toward the first antenna 3271 or the third antenna 3273 by the change distance as compared to the position of reception of the estimation signal Sc.

The resource selector section 3234 uses the above estimation to determine an estimated value of the propagation path characteristics information CC that prevails when the second antenna 3272 is used at the time determined by the timing determiner section 3233. Two propagation path characteristics informations CC are used to determine the estimated value of propagation path characteristics information. The first information is the propagation path characteristics information CCB1-B2 (t1) associated with the second antenna 3272. The second information is either the propagation path characteristics information CCA1-B2 (t1) or the propagation path characteristics information CCC1-B2 (t1), whichever is associated with an antenna positioned close to the second antenna 3272 at the time determined by the timing determiner section 3233. These two propagation path characteristics informations CC are, for example, extrapolated or interpolated at the ratio of the change distance to the inter-antenna distance to determine the estimated value of the propagation path characteristics information CC that prevails when the second antenna 3272 is used at the time determined by the timing determiner section 3233.

The propagation path characteristics information CC represented by a solid line in FIG. 27 (B) is an estimated value of propagation path characteristics information CCB1-B2 (t2) at time t2, which is the time determined by the timing determiner section 3233. Dotted lines in FIG. 27 (B) represent the three propagation path characteristics informations CC in FIG. 27 (A), which are depicted for comparison purposes. The estimated value of the propagation path characteristics information CCB1-B2 (t2) in FIG. 27 (B) indicates that the first in-vehicle terminal 3200 is higher in movement speed than the second in-vehicle terminal 3300. At the time determined by the timing determiner section 3233, therefore, the second antenna 3272 is positioned more forward in the travel direction of the vehicle 6 than the position of the first antenna 3271 at the time of reception of estimation signal Sc, as indicated in FIG. 22 (B). Consequently, the estimated value of the propagation path characteristics information CCB1-B2 (t2) is determined by extrapolation from the propagation path characteristics information CCB1-B2 (t1) and the propagation path characteristics information CCA1-B2 (t1).

The determined estimated value of the propagation path characteristics information CCB1-B2 (t2) is then used to select a resource for communication at the communication position, as is the case with the sixth embodiment.

The outgoing signal generator section 3235 not only generates the estimation signal Sc as described, but also generates the estimation signal Sc even when the communication position is determined and a resource for use at the communication position is selected. Further, the outgoing signal generator section 3235 also generates the main signals.

At the time determined by the timing determiner section 3233, the communication controller section 3236 transmits from the second antenna 3272 the estimation signal Sc and main signals generated by the outgoing signal generator section 3235. In this instance, the second antenna 3272 functions as the target apparatus rear antenna. The first antenna 3271 positioned forward of the second antenna 3272 corresponds to the target apparatus front antenna.

The above state prevails at time t2 in FIG. 22 (B). The reference signal R, which is among the estimation signal Sc and main signals, is allocated to all subchannels. The other signals are transmitted by using a resource selected by the resource selector section 3234.

In FIG. 22 (B), the second in-vehicle terminal 3300 receives the estimation signal Sc through the first antenna 3371, the second antenna 3372, and the third antenna 3373. In this instance, the third antenna 3373 is at the communication position and functions as the rear antenna and as the selected resource antenna. The signal received through the third antenna 3373 provides highly reliable communication.

The characteristics information determiner section 3331, which has the same function as the characteristics information determiner section 3231, determines the propagation path characteristics information CC from the estimation signal Sc received through the first antenna 3371, the second antenna 3372, and the third antenna 3373. The position of the second antenna 3372 at the time of reception is regarded as the communication position. FIG. 27 (C) illustrates three propagation path characteristics informations CCA2-B1 (t2), CCB2-B1 (t2), CCC2-B1 (t2), which are determined by the characteristics information determiner section 3331 from the estimation signal Sc received at time t2.

The propagation path characteristics acquirer section 3332 acquires the three propagation path characteristics informations CCA2-B1 (t2), CCB2-B1 (t2), CCC2-B1 (t2) from a storage unit 3320. The timing determiner section 3333 predicts the time at which the third antenna 3273 of the first in-vehicle terminal 3200 is placed at a position where the estimation signal Sc is received by the second antenna 3272, that is, at the communication position determined by the characteristics information determiner section 3331. The predicted time is regarded as time t3.

Based on the three propagation path characteristics informations CC determined by propagation path characteristics acquirer section 3332, the resource selector section 3334 selects a resource for communication at the communication position determined by the characteristics information determiner section 3331. For resource selection, the resource selector section 3334 performs the same process as the resource selector section 3234 to determine the estimated value of propagation path characteristics information CCB2-C1 (t3) in FIG. 27 (D). In FIG. 27 (D), too, the three propagation path characteristics informations CC in FIG. 27 (C) are represented by dotted lines for comparison purposes. The resource for use at the communication position is selected based on the estimated value of the propagation path characteristics information CCB2-C1 (t3).

The outgoing signal generator section 3335 generates the estimation signal Sc and the main signals. Then, at time t3, the communication controller section 3336 transmits the estimation signal Sc and the main signals from the second antenna 3372. This state is illustrated in FIG. 22 (C). A comparison between FIG. 22 (A) and FIG. 22 (C) indicates that the states illustrated in FIG. 22 (A) and FIG. 22 (C) are the same except for the positions of the vehicles 4, 6. Consequently, the seventh embodiment ensures that highly reliable bidirectional communication can be repeatedly established between the first in-vehicle terminal 3200 and the second in-vehicle terminal 3300.

Eighth Embodiment

Figure 28:
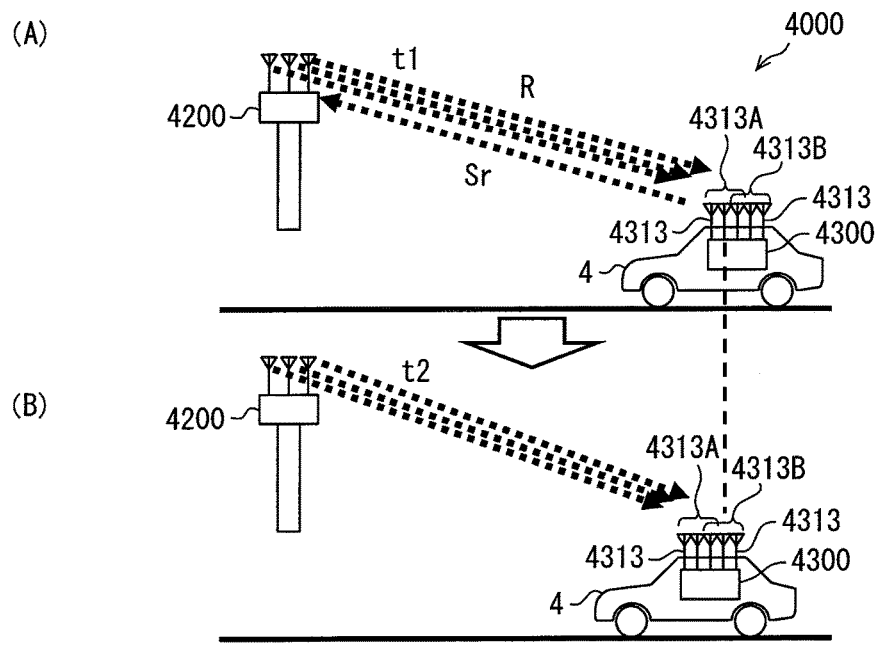
FIG. 28 is a diagram illustrating a configuration of a mobile communication system according to an eighth embodiment.

As in FIG. 28, a mobile communication system 4000 according to an eighth embodiment includes a base station 4200 and an in-vehicle terminal 4300. The base station 4200 corresponds to the target communication apparatus. The in-vehicle terminal 4300 corresponds to the mobile communication apparatus. The mobile communication system 4000 may include a plurality of base stations 4200 and a plurality of in-vehicle terminals 4300.

[Configuration of in-Vehicle Terminal 4300]

As in FIG. 28, the in-vehicle terminal 4300 includes a plurality of antenna elements 4313. The antenna elements 4313 are equal in structure, mounted on the roof of the vehicle 4, positioned at the same height, and periodically disposed.

A MIMO technology is applied to the antenna elements 4313 so that the antenna elements 4313 are dynamically allocated to two antennas, namely, a front antenna 4313A and a rear antenna 4313B. Specifically, the front antenna 4313A and the rear antenna 4313B are antenna element groups that include a plurality of antenna elements 4313. The front antenna 4313A functions as the reference antenna, and the rear antenna 4313B functions as the selected resource antenna.

Figure 29:
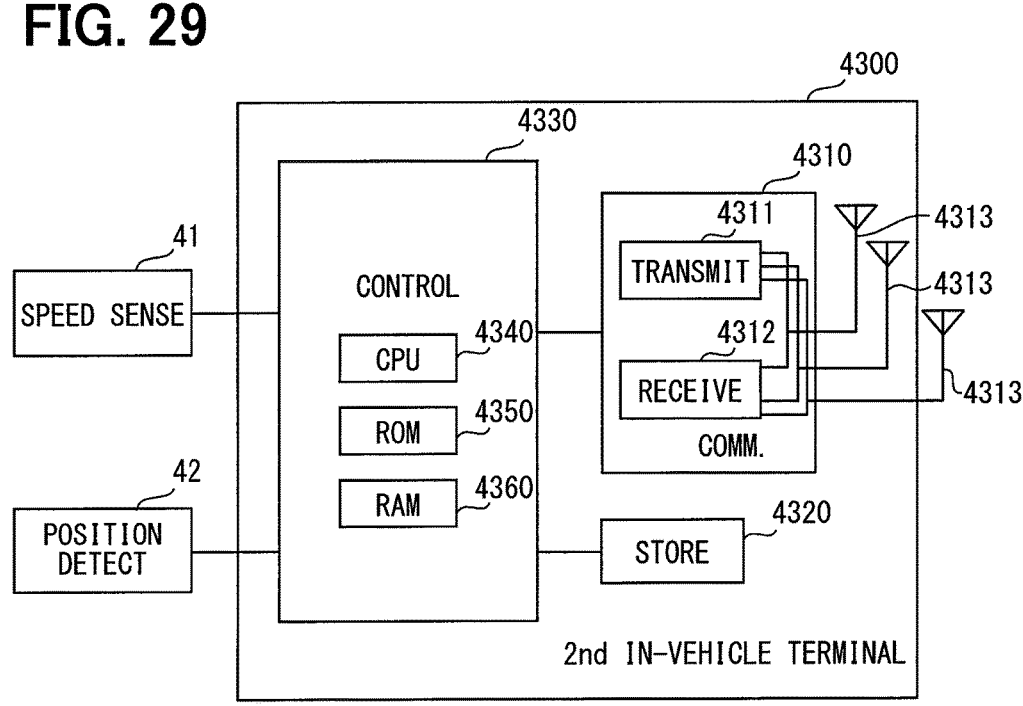
FIG. 29 is a block diagram illustrating a configuration of an in-vehicle terminal in FIG. 28.

As in FIG. 29, the in-vehicle terminal 4300 includes a communicator 4310, a storage unit 4320, and a control circuit 4330. The communicator 4310 includes a transmitter 4311 and a receiver 4312 in addition to the antenna elements 4313. The transmitter 4311 and the receiver 4312 use the antenna elements 4313 for transmission and reception purposes. The transmitter 4311 and the receiver 4312 have the same functions as the transmitter 1311 and receiver 1312 according to the fourth embodiment except that the former transmitter and receiver use the antenna elements.

Figure 30:
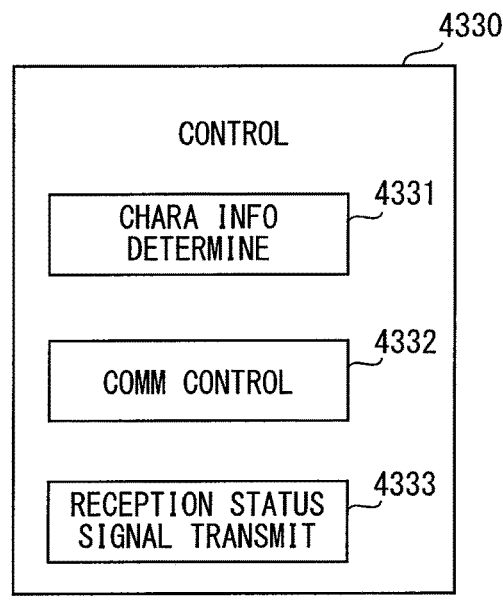
FIG. 30 is a diagram illustrating the functions of a control circuit in FIG. 29.

As in FIG. 30, the control circuit 4330 includes, as its functions, a characteristics information determiner section 4331, a communication controller section 4332, and a reception status signal transmitter section 4333.

First of all, the characteristics information determiner section 4331 will be described. In the eighth embodiment, too, the base station 4200 periodically transmits the reference signal R. The in-vehicle terminal 4300 receives the reference signal R through the front antenna 4313A and the rear antenna 4313B. The antenna elements 4313 forming the front antenna 4313A and the rear antenna 4313B may be determined in advance by the control circuit 4330 of the in-vehicle terminal 4300. Alternatively, the base station 4200 may make such a determination and notify the in-vehicle terminal 4300 of the determined antenna elements 4313 simultaneously with or prior to the reference signal R.

The characteristics information determiner section 4331 acquires the reference signal R received by the antenna elements 4313 from the receiver 4312. The characteristics information determiner section 4331 then determines the propagation path characteristics information CC with respect to all antenna elements 4313 that are included in the front antenna 4313A and the rear antenna 4313B and used for transmission from the base station 4200. The propagation path characteristics information CC may be determined in the same manner as described in conjunction with the foregoing embodiments.

The communication controller section 4332 determines antenna elements 4313 for use as the front antenna 4313A and the rear antenna 4313B from the antenna elements 4313, and configures the front antenna 4313A and the rear antenna 4313B accordingly. The front antenna 4313A and the rear antenna 4313B receive the reference signal R. The rear antenna 4313B receives the reference signal R to determine the reproducibility index. If the reproducibility index is not to be determined, the rear antenna 4313B does not need to receive the reference signal R.

To determine the antenna elements 4313 to be allocated to the front antenna 4313A and the rear antenna 4313B, the communication controller section 4332 uses the movement speed of the in-vehicle terminal 4300 and a transmission cycle in which the base station 4200 transmits a signal. The distance moved by the in-vehicle terminal 4300 during one transmission cycle is calculated by multiplying the movement speed of the in-vehicle terminal 4300 by the transmission cycle in which the base station 4200 transmits a signal.

The allocation of the antenna elements 4313 is determined in such a manner that the distance between associated antenna elements 4313 of the front antenna 4313A and rear antenna 4313B (hereinafter referred to as the inter-antenna distance) d is equal to or longer than the distance moved by the in-vehicle terminal 4300 during one transmission cycle.

Further, the antenna elements 4313 to be allocated to the front antenna 4313A and the rear antenna 4313B are selected in such a manner that the antenna elements 4313 forming the front antenna 4313A and the antenna elements 4313 forming the rear antenna 4313B are arranged in the same pattern.

Figure 31:
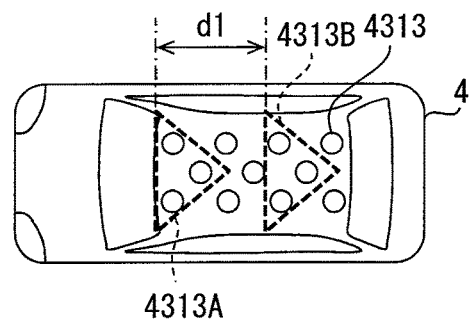
FIG. 31 is a diagram illustrating an allocation example of a front antenna and a rear antenna allocated by a communication controller section in FIG. 30.
Figure 32:
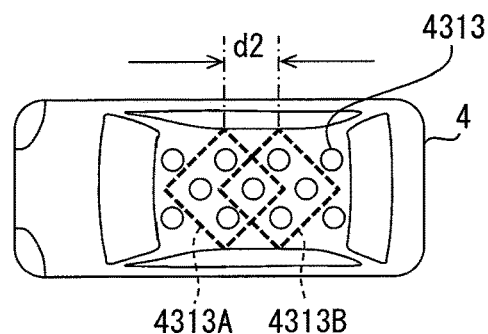
FIG. 32 is a diagram illustrating another allocation example of a front antenna and a rear antenna allocated differently from FIG. 31.

The allocation may be determined in advance by the base station 4200 and reported to the in-vehicle terminal 4300. When the in-vehicle terminal 4300 determines the allocation, the transmission cycle in which the base station 4200 transmits a signal can be acquired by the in-vehicle terminal 4300 as far as a signal indicative of the transmission cycle is transmitted from the base station 4200 and received by the in-vehicle terminal 4300. An alternative is to receive and measure a signal transmitted from the base station 4200. FIG. 31 illustrates an allocation example in which the front antenna 4313A and the rear antenna 4313B are allocated. FIG. 32 illustrates another allocation example in which the front antenna 4313A and the rear antenna 4313B are allocated. In FIGS. 31 and 32, the antenna elements 4313 forming the front antenna 4313A and the antenna elements 4313 forming the rear antenna 4313B are arranged in the same pattern.

Further, the inter-antenna distance d is d1 in FIG. 31 and d2 in FIG. 32. The distance d2 is shorter than the distance d1. As described, the inter-antenna distance d can be changed by changing the allocation of the antenna elements 4313.

The reception status signal transmitter section 4333 transmits a reception status signal Sr from the transmitter 4311 to the base station 4200. The reception status signal Sr includes (i) the movement speed and current position of the in-vehicle terminal 4300 at the time of reception of the reference signal R, (ii) the inter-antenna distance d, (iii) the ID of the in-vehicle terminal 4300, and (iv) the following propagation path characteristics information CC. That is, the propagation path characteristics information CC is about all combinations between (i) antenna elements 4313 forming the front antenna 4313A and antenna elements 4313 forming the rear antennas 4313B and (ii) the antenna elements 4213 used for transmission from the base station 4200.

FIG. 28 (A) illustrates a state where the reference signal R is transmitted from the base station 4200 at time t1 and the reception status signal Sr is subsequently transmitted from the in-vehicle terminal 4300.

[Configuration of Base Station 4200]

Figure 33:
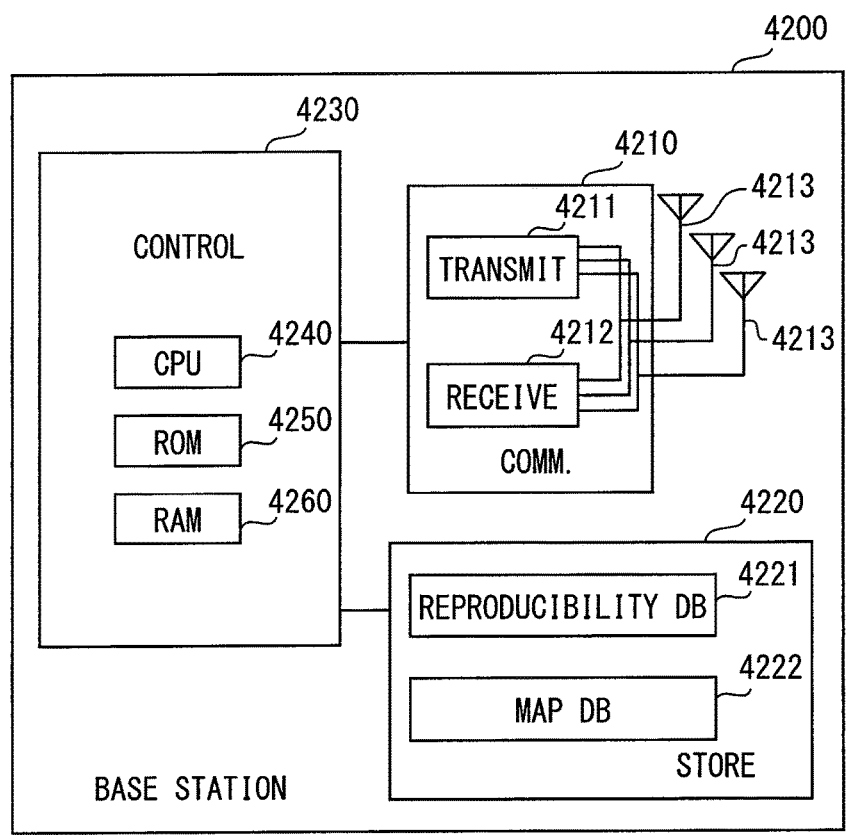
FIG. 33 is a block diagram illustrating a configuration of a base station in FIG. 28.

As in FIG. 33, the base station includes a plurality of antenna elements 4213 in place of the antenna 213 in FIG. 2. The other hardware configuration is the same as that of the base station 200 according to the first embodiment. Specifically, the base station 4200 includes a communicator 4210, a storage unit 4220, and a control circuit 4230. The communicator 4210 includes a transmitter 4211 and a receiver 4212. The control circuit 4230 includes a CPU 4240, a ROM 4250, and a RAM 4260.

The storage unit 4220 stores a reproducibility index database 4221 and a road map database 4222. In the reproducibility index database 4221, a reproducibility index determined by a later-described reproducibility determiner section 4235 is associated with a point (i.e., spot).

Figures 34, 35:
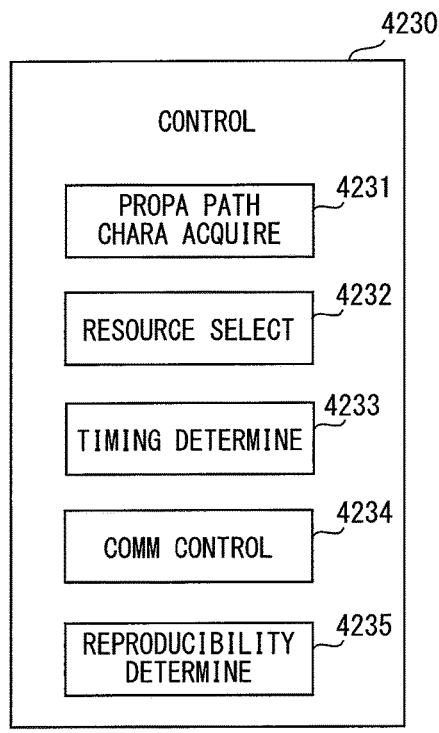
FIG. 34 is a diagram illustrating the functions of a control circuit in FIG. 33.
FIG. 35 is a diagram illustrating the relationship between an antenna element use pattern and an index used by a resource selector section in FIG. 34 to select a spatial resource.

As in FIG. 34, the control circuit 4230 includes, as its functions, a propagation path characteristics acquirer section 4231, a resource selector section 4232, a timing determiner section 4233, a communication controller section 4234, and the reproducibility determiner section 4235.

The propagation path characteristics acquirer section 4231 acquires from the receiver 4212 the propagation path characteristics information CC that is transmitted from the in-vehicle terminal 4300 and received by the receiver 4212. The acquired propagation path characteristics information CC associated with the front antenna 4313A is regarded as the front antenna propagation path characteristics information CCA, and the acquired propagation path characteristics information CC associated with the rear antenna 4313B is regarded as the rear antenna propagation path characteristics information CCB. It is assumed that the propagation path characteristics information CC is acquired when the in-vehicle terminal 4300 is at the reception position (i.e., at the communication position). Namely, the front antenna propagation path characteristics information CCA and the rear antenna propagation path characteristics information CCB are associated with the communication position.

The resource selector section 4232 regards the position where the reference signal R is received by the front antenna 4371A as the communication position, and determines the resource to be used for communication at the communication position based on the front antenna propagation path characteristics information CCA acquired by the propagation path characteristics acquirer section 4231. The resource selector section 4232 acquires a reproducibility index associated with the reception position from the reproducibility index database 4221 and selects a resource by using the reproducibility index in addition to the front antenna propagation path characteristics information CCA.

FIG. 35 illustrates the relationship between an index used by the resource selector section 4232 to select a resource and a pattern of use of the antenna elements 4313. The reproducibility index is acquired from the reproducibility index database 4221 and associated with the reception position.

The amount of resource having an estimated signal-to-noise ratio equal to or higher than a standard is determined from propagation path characteristics information CC estimated at the communication position. The propagation path characteristics information CC estimated at the communication position is determined in the same manner as described in conjunction with the fifth embodiment.

The amount of resource having an estimated signal-to-noise ratio equal to or higher than the standard may be determined from the determined propagation path characteristics information CC by using the same method as exercised in conjunction with the well-known MIMO technology. For example, the signal-to-noise ratio of each resource that prevails when beamforming, diversity coding, spatial multiplexing (multistreaming), or a combination of these is performed by using a well-known technology is estimated based on propagation path characteristics information, and then the amount of resource having a signal-to-noise ratio equal to or higher than the standard is determined. However, for the sake of simplicity, FIG. 35 merely illustrates some patterns that use beamforming, diversity coding, or spatial multiplexing. The "resource" of the "amount of resource" has the same meaning as in the foregoing embodiments. However, the embodiment uses the MIMO technology. Therefore, resources selected by the resource selector section 4232 include a spatial resource that permits the MIMO technology to generate the degree of freedom of determination. The spatial resource is determined by selecting an antenna element use pattern.

A maximum speed is determined by further considering the modulation rate available for each resource, that is, the amount of data transmittable per resource. The available modulation rate is determined based on the estimated signal-to-noise ratio. The method of determining the available modulation rate may be the same as exercised in conjunction with a well-known adaptive modulation technology. For the sake of simplicity, FIG. 35 indicates values that can be obtained when the ratio of the resource amount to the maximum speed is 3:1. These values are applicable to a case where all resources having an estimated signal-to-noise ratio equal to or higher than the standard are used at the same modulation rate.

The resource selector section 4232 selects a resource for the next communication from indexes illustrated in FIG. 35 and indexes important for the next communication. When the reliability of communication is an important index, directivity 2 of singlestreaming, which is a use pattern exhibiting high reproducibility and involving a large amount of resource having an estimated signal-to-noise ratio equal to or higher than the standard, is selected as an antenna use pattern that determines the spatial resource. Meanwhile, when the communication speed is an important index, multistreaming with two streams exhibiting the highest maximum speed is selected as the antenna use pattern. The method of selecting a frequency and a time resource is the same as described in conjunction with the foregoing embodiments.

Based on the movement speed of the in-vehicle terminal 4300, which is received by the receiver 4212, the timing determiner section 4233 determines the rear communication time, which is the time at which the rear antenna 4313B is placed at a position where the reference signal R is received by the front antenna 4313A.

The communication controller section 4234 periodically transmits the reference signal R from the transmitter 4211. Further, at the rear communication time determined by the timing determiner section 4233, the communication controller section 4234 transmits a predetermined signal to the in-vehicle terminal 4300 by using a resource that is selected by the resource selector section 4232 as the resource for use at the rear communication time. Furthermore, in addition to the predetermined signal, the reference signal R is transmitted by using all the subchannels, as is the case with the fifth embodiment. The communication controller section 4234 corresponds to the target apparatus communication controller section.

The reproducibility determiner section 4235 determines the reproducibility index indicative of reproducibility of the propagation path characteristics information CC by comparing the front antenna propagation path characteristics information CCA with the rear antenna propagation path characteristics information CCB, which is determined from the reference signal R transmitted from the base station 4200 at the rear communication time. The reproducibility determiner section 4235 may determine the reproducibility index in the same manner as the reproducibility determiner section 1235 according to the fifth embodiment. Further, the reproducibility determiner section 4235 associates the determined reproducibility index with the communication position, and updates the reproducibility index database 4221 based on the determined reproducibility index and the communication position. The updated reproducibility index database 4221 is used at the time of resource selection as described.

While the embodiments of the present disclosure have been described above, it should be understood that the present disclosure is not limited to the above-described embodiments. The following modifications are also included in the technical scope of the present disclosure. Further, in addition to the following modifications, various other modifications may be made without departing from the spirit of the present disclosure.

<First Modification>

FIG. 3 depicts the propagation path characteristics information CC by illustrating the relationship between signal-to-noise ratio and frequency. However, an alternative is to use the relationship between signal-to-noise ratio and impulse response instead of frequency.

<Second Modification>

The eighth embodiment may differently be configured to determine a reproducibility index by comparing signals successively transmitted from the in-vehicle terminal 4300 while eliminating the reproducibility index database 4221. Such configuration does not allow the reproducibility index to represent the reproducibility at exactly the same position. However, the eighth embodiment, which only adopts the reproducibility index for determining the use pattern, can still utilize the above reproducibility index even failing to represent the reproducibility at exactly the same position. Further, the reproducibility index is not essential to determine the use pattern.

<Third Modification>

The foregoing embodiments assume the mobile object as an automobile. Alternatively, the mobile object may be a railroad vehicle, a bicycle, or a pedestrian. When the mobile communication apparatus is held by a pedestrian, the radio wave propagation map 221 may be created for each of a plurality of predefined holding styles, such as a front holding style or a pocket holding style. To detect such a holding style, the mobile communication apparatus may include a camera, as a smartphone does. The front holding style may be determined when the camera captures an image of the face of the pedestrian. When an acceleration sensor is employed to successively detect the amount of movement of the mobile communication apparatus relative to the position of such a front holding style, the holding style for the mobile communication apparatus can be detected. A simpler alternative is to attach a display to the mobile communication apparatus, designate the holding style to be employed by the pedestrian, and instruct the pedestrian to press a button when the designated holding style is employed.

<Fourth Modification>

In the foregoing embodiments, the reference signal R is transmitted to determine the propagation path characteristics information CC. However, the transmission of the reference signal R is not essential to determine the propagation path characteristics information CC. The reference signal R is a signal known by the receiving end. However, if the receiving end returns a reception status to the transmitting end, the transmitting end can determine the propagation path characteristics information CC from the returned reception status and a signal transmitted from the transmitting end because the transmitted signal is known to the transmitting end. This instance may use any signal for determining the propagation path characteristics information CC, providing an advantage in eliminating overhead introduced by adding the reference signal R.

<Fifth Modification>

The radio wave propagation map 221 may be stored by a server capable of communicating with the base station 200.

<Sixth Modification>

In the first embodiment, the model of the in-vehicle terminal 300 is regarded as the antenna determination information, and the radio wave propagation map 221 used by the propagation path characteristics acquirer section 234 to acquire the propagation path characteristics information CC is the same as for the model of the in-vehicle terminal 300, which is included in the position prediction information. The reason is that the antenna characteristics remain unchanged when the same model is employed. Alternatively, information other than the model of the in-vehicle terminal 300 may be used to determine whether the same antenna characteristics are exhibited. The degree of similarity regarding the antenna characteristics as being the same is determined depending on performance requirements.

A sixth modification uses antenna determination information other than the model of the in-vehicle terminal 300. Specifically, the antenna determination information uses the model name of the vehicle 4, which may be referred to as the vehicle name. As far as being attached to the vehicle 4 prior to its shipment, the model of the in-vehicle terminal 300 can be identified by determining the model name of the vehicle 4; thus, the model name of the vehicle 4 can be used as the antenna determination information. As classifying the vehicle 4, the model name of the vehicle 4 corresponds to an example of a vehicle classification.

In the sixth modification, the characteristics determination information uploader section 335 and position prediction information uploader section 336 of the in-vehicle terminal 300 upload the model name of the vehicle 4 instead of the model of the in-vehicle terminal 300. To upload the model name of the vehicle 4, the storage unit 320 of the in-vehicle terminal 300 stores the model name of the vehicle 4 in advance.

The radio wave propagation map 221 stored in the base station 200 is created by preparing the propagation path characteristics information CC for each model name of the vehicle 4. Based on the model name of the vehicle 4, the map adjuster section 231 identifies the radio wave propagation map 221 to be updated. The radio wave propagation map 221 used by the propagation path characteristics acquirer section 234 to acquire the propagation path characteristics information CC is the same as for the model name of the vehicle 4 that is included in the position prediction information.

<Seventh Modification>

A seventh modification uses a vehicle type classification as the antenna determination information. The vehicle type classification is performed by classifying the types of vehicles according to similarity of antenna characteristics. When the model name of the vehicle 4 described in conjunction with the sixth modification is used as the antenna determination information, the same antenna characteristics are considered to be exhibited as far as the same model name of the vehicle 4 is encountered. This provides an advantage enabling a resource selection based on the propagation path characteristics information CC having the same antenna characteristics as the selected resource antenna. However, the radio wave propagation map 221 needs to be prepared for each model name of the vehicle 4.

The vehicle type classification is performed to provide higher versatility of the radio wave propagation map 221 than the model name of the vehicle 4. A range within which the antenna characteristics remain unchanged is regarded as one classification. Thus, the vehicle type classification relates to a concept wider than the model name of the vehicle 4 that is described in conjunction with the sixth modification. Meanwhile, when vehicles are broadly classified, a concept such as an automobile or a railroad vehicle is encountered. These classifications are based on a social infrastructure on which the vehicles travel. However, the vehicle type classification performed here relates to a concept narrower than an automobile and a railroad vehicle. Specifically, the vehicle type classification may be a passenger car or a bus under the automobile, or a bullet train under the railroad vehicle. The vehicle type classification may be performed according to the overall height of a vehicle. The vehicle type classification provides the classification of vehicles and thus corresponds to an example of a vehicle classification.

In the seventh modification, the characteristics determination information uploader section 335 and position prediction information uploader section 336 of the in-vehicle terminal 300 upload the vehicle classification instead of the model of the in-vehicle terminal 300. To upload the vehicle type classification, the storage unit 320 of the in-vehicle terminal 300 stores the vehicle type classification in advance.

The radio wave propagation map 221 stored in the base station 200 is created by preparing the propagation path characteristics information CC for each vehicle type classification. Based on the vehicle type classification, the map adjuster section 231 identifies the radio wave propagation map 221 to be updated. The radio wave propagation map 221 used by the propagation path characteristics acquirer section 234 to acquire the propagation path characteristics information CC is the same as for the vehicle type classification included in the position prediction information.

<Eighth Modification>

An eighth modification uses the mounting height of the antenna as the antenna determination information. The propagation path characteristics vary with the three-dimensional position. Therefore, the mounting height of the antenna is also applicable as an antenna characteristic.

In the eighth modification, the characteristics determination information uploader section 335 and position prediction information uploader section 336 of the in-vehicle terminal 300 upload the mounting height of the antenna 313, that is, the antenna determination information including the mounting height of the selected resource antenna, instead of the model of the in-vehicle terminal 300. The mounting height of the antenna 313 is stored beforehand in the storage unit 320. The antenna determination information to be uploaded may include the antenna format and the antenna posture in addition to the mounting height of the selected resource antenna.

The radio wave propagation map 221 stored in the base station 200 is created by preparing the propagation path characteristics information CC for each reference antenna classified according to the aforementioned antenna determination information. Namely, the radio wave propagation map 221 is created by preparing the propagation path characteristics information CC for each mounting height of the reference antenna and for each antenna format and other antenna determination information.

Based on the position of reception of the reference signal R and the propagation path characteristics information CC, which are uploaded together with the antenna determination information by the characteristics determination information uploader section 335, the map adjuster section 231 updates the radio wave propagation map 221 for the reference antenna that is equal to the antenna 313 in the mounting height and other antenna characteristics.

The radio wave propagation map 221 used by the propagation path characteristics acquirer section 234 to acquire the propagation path characteristics information CC is determined by antenna determination information other than the antenna mounting height included in the position prediction information and in compliance with a mounting height condition.

The mounting height condition is that the difference or ratio between the mounting height of the antenna 313, which is included in the position prediction information, and the mounting height of the reference antenna is within a predetermined range. If two or more reference antennas comply with the condition, the radio wave propagation map 221 for a reference antenna having a mounting height closest to the mounting height of the antenna 313 is used to acquire the propagation path characteristics information CC.

Even when vehicles differ in vehicle model, the eighth modification can apply the same radio wave propagation map 221 to the vehicles as far as they are equal in antenna mounting height and other antenna characteristics. For example, a station wagon car having a relatively small overall height and a sedan car having a relatively great overall height are different in vehicle model, but their antenna mounting heights may comply with the aforementioned mounting height condition. Further, the eighth modification can apply radio wave propagation maps 221 for different antenna mounting heights to vehicles having a vehicle height adjustment function even when the vehicles are equal in vehicle model.

<Ninth Modification>

A ninth modification uses a holding style for the antenna 313 as the antenna determination information. Specifically, the holding style indicates whether the antenna is securely fixed. When the antenna is not securely fixed, a mobile terminal is used as the mobile communication apparatus and is not attached to a holder secured to the mobile object. Whether the mobile terminal is attached to the holder secured to the mobile object is determined based on the acceleration detected by an acceleration sensor incorporated in the mobile terminal. When the mobile terminal is moved without being attached to the holder secured to the mobile object, the acceleration detected by the acceleration sensor exhibits more complicated temporal changes than when the mobile terminal is attached to the holder. Thus, whether the mobile terminal is attached to the holder is determined based on the temporal changes in the acceleration. Further, when the mobile terminal is not attached to the holder secured to the mobile object, the position of the mobile terminal exhibits more complicated temporal changes than when the mobile terminal is attached to the holder. Thus, whether the mobile terminal is attached to the holder may be determined based on the temporal changes in the position.

In the ninth modification, the characteristics determination information uploader section 335 and position prediction information uploader section 336 of the mobile communication apparatus upload information indicative of whether the mobile communication apparatus is secured, as the antenna determination information, instead of the model of the in-vehicle terminal 300. The storage unit 320 of the mobile communication apparatus stores information indicative of whether the mobile communication apparatus is of a fixed type or of a portable type. If the mobile communication apparatus is of a fixed type, it is assumed that the mobile communication apparatus is secured. Meanwhile, if the mobile communication apparatus is a mobile terminal, whether the mobile communication apparatus is attached to the holder secured to the mobile object is determined based on temporal changes in the acceleration of position.

Further, the mobile communication apparatus of a fixed type also uploads, as the holding style, information indicative of a securing part to which the mobile communication apparatus is secured. Securing parts are also stored in the storage unit 320. The securing parts are differentiated from each other depending on whether the antenna characteristics vary. The securing parts stored in memory are, for example, a rooftop, a mirror, a window, and a trunk grid.

Meanwhile, if the mobile communication apparatus is of a portable type, whether the mobile communication apparatus is used in a mobile object having a plurality of seats is determined. If it can be determined that the mobile communication apparatus is used in a mobile object having a plurality of seats, which seat is the place of the mobile communication apparatus is also determined.

Further, information indicative of whether the mobile communication apparatus is used in a mobile object having a plurality of seats and information indicative of a seat in which the mobile communication apparatus is used are additionally uploaded as the holding style. Whether the mobile communication apparatus is used in a mobile object having a plurality of seats and which seat is the place of the mobile communication apparatus are determined based on inquiries to a user holding the mobile communication apparatus.

The radio wave propagation map 221 stored in the base station 200 is created by preparing the propagation path characteristics information CC that varies depending on whether the mobile communication apparatus is of a fixed type or of a portable type. Further, for the mobile communication apparatus of a fixed type, the propagation path characteristics information CC on each of the aforementioned securing parts is prepared. Meanwhile, for the mobile communication apparatus of a portable type, the radio wave propagation map 221 is created variously depending on whether the mobile communication apparatus is used in a mobile object having a plurality of seats. Further, the radio wave propagation map 221 for the mobile communication apparatus used in a mobile object having a plurality of seats is created for each seat where the mobile communication apparatus is used.

The map adjuster section 231 updates the radio wave propagation map 221 that is equal in holding style to the antenna determination information. Further, the radio wave propagation map 221 used by the propagation path characteristics acquirer section 234 to acquire the propagation path characteristics information CC is equal in holding style to the antenna determination information.

<Tenth Modification>

In the eighth modification, the antenna type may also be used as the antenna determination information in addition to the antenna mounting height. Further, in the ninth modification, the antenna type may also be used as the antenna determination information in addition to the holding style.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A mobile communication system including (i) a mobile communication apparatus used in a mobile object and (ii) a target communication apparatus that is a target with which the mobile communication apparatus communicates, the mobile communication apparatus including a selected resource antenna permitting communication using a selected resource, the mobile communication apparatus establishing wireless communication using the selected resource antenna, the mobile communication system comprising:
a control circuit configured to acquire propagation path characteristics information in association with a future communication position, the propagation path characteristics information being information about propagation path characteristics between (i) the target communication apparatus and (ii) a reference antenna that is equal to the selected resource antenna in antenna characteristics, the antenna characteristics including at least an antenna format,
the control circuit being further configured to select, based on the acquired propagation path characteristics information, in advance a resource used in communication at the future communication position between the mobile communication apparatus and the target communication apparatus before the selected resource antenna of the mobile communication apparatus comes to be placed at the future communication position.

2. The mobile communication system according to claim 1,
wherein the control circuit is further configured
to acquire position prediction information to predict a position of the selected resource antenna of the mobile communication apparatus, and
to determine successively a predicted position of the selected resource antenna based on the position prediction information,
wherein:
the control circuit acquires the propagation path characteristics information at the predicted position from a radio wave propagation map that is a database storing the propagation path characteristics information in association with the future communication position; and
the control circuit regards the predicted position as the future communication position and selects a resource used in communication at the predicted position between the mobile communication apparatus and the target communication apparatus.

3. The mobile communication system according to claim 2,
wherein:
the target communication apparatus is a base station;
the base station includes the control circuit and a storage storing the radio wave propagation map;
the radio wave propagation map stores the propagation path characteristics information about a plurality of different types of the reference antenna;
the mobile communication apparatus includes a different control circuit configured to upload, to the base station, (i) the position prediction information when and after uploading and (ii) antenna determination information used to determine the antenna characteristics; and
the control circuit in the base station
regards the predicted position as the future communication position,
determines the reference antenna based on the antenna determination information uploaded from the mobile communication apparatus, and
acquires from the radio wave propagation map the propagation path characteristics information dependent on the predicted position and the determined reference antenna.

4. The mobile communication system according to claim 3,
wherein:
the mobile object is a vehicle;
the different control circuit in the mobile communication apparatus in the vehicle uploads a vehicle classification as the antenna determination information, the vehicle classification being obtained by classifying the vehicle according to the antenna characteristics exhibited when the mobile communication apparatus is used in the vehicle; and
the control circuit in the base station determines the reference antenna based on the vehicle classification.

5. The mobile communication system according to claim 4,
wherein:
the different control circuit in the vehicle uploads a model name of the vehicle as the vehicle classification; and
the control circuit in the base station determines the reference antenna based on the model name of the vehicle.

6. The mobile communication system according to claim 4,
wherein:
the different control circuit in the vehicle uploads a vehicle type classification as the vehicle classification, the vehicle type classification being obtained by classifying a type of the vehicle according to similarity of the antenna characteristics; and
the control circuit in the base station determines the reference antenna based on the vehicle type classification.

7. The mobile communication system according to claim 3,
wherein:
the mobile object is a vehicle;
the different control circuit in the mobile communication apparatus in the vehicle uploads a mounting height of the selected resource antenna when the mobile communication apparatus is used in the vehicle; and
the control circuit in the base station determines the reference antenna based on (i) the mounting height of the selected resource antenna and (ii) the mounting height of the reference antenna.

8. The mobile communication system according to claim 3,
wherein:
the different control circuit in the mobile communication apparatus uploads a holding style of the selected resource antenna as the antenna determination information; and
the control circuit in the base station determines the reference antenna based on whether the selected resource antenna is equal to the reference antenna in holding style.

9. The mobile communication system according to claim 8,
wherein when determining whether the selected resource antenna is equal to the reference antenna in holding style, the control circuit in the base station determines based on whether the selected resource antenna and the reference antenna are both secured.

10. The mobile communication system according to claim 9,
wherein, when determining whether the selected resource antenna is equal to the reference antenna in holding style, the control circuit in the base station determines based on whether each of the selected resource antenna and the reference antenna is secured to an identical securing part as well as whether the selected resource antenna and the reference antenna are both secured.

11. The mobile communication system according to claim 8,
wherein, when the selected resource antenna and the reference antenna are both unsecured, the control circuit in the base station determines whether the selected resource antenna is equal to the reference antenna in holding style based on whether each of the selected resource antenna and the reference antenna is placed in an identical seat.

12. The mobile communication system according to claim 3,
wherein:
the mobile communication apparatus includes the reference antenna;
the different control circuit is further configured
to successively determine a current position, and
to upload (i) characteristics determination information and (ii) an uploading-time position to the base station,
the characteristics determination information being either the propagation path characteristics information or information determining the propagation path characteristics information,
the uploading-time position being the current position that is most lately determined; and
the control circuit in the base station is further configured to update the radio wave propagation map based on the characteristics determination information and the uploading-time position, which are uploaded by the mobile communication apparatus.

13. The mobile communication system according to claim 12,
wherein:
the radio wave propagation map in the base station includes a reliability index indicative of reliability of the propagation path characteristics information included in the radio wave propagation map; and
the control circuit in the base station selects a resource by using the propagation path characteristics information and the reliability index related to the propagation path characteristics.

14. The mobile communication system according to claim 13,
wherein the reliability index is a reproducibility index indicative of reproducibility of the propagation path characteristics information, the reproducibility index being determined based on a plurality of the propagation path characteristics informations on positions each identical to the future communication position.

15. The mobile communication system according to claim 13,
wherein:
the different control circuit in the mobile communication apparatus further configured
to detect, upon receipt of a signal transmitted from the base station, an error in the received signal, and
to upload error resource information to the base station, the error resource information being indicative of a resource used to transmission of the signal having the detected error; and
the control circuit in the base station is further configured to update the reliability index based on the error resource information.

16. The mobile communication system according to claim 12,
wherein:
the mobile communication apparatus includes
a download data storage that stores the radio wave propagation map downloaded from an outside source;
the different control circuit is further configured
to determine the propagation path characteristics information, when the reference antenna receives a signal transmitted from the base station, and
to determine a propagation path characteristics difference, the propagation path characteristics difference being a difference between the propagation path characteristics information and a portion of the radio wave propagation map stored in the download data storage, the portion corresponding to the propagation path characteristics information;
the different control circuit uploads the propagation path characteristics difference as the characteristics determination information; and
the control circuit in the base station updates the radio wave propagation map based on the propagation path characteristics difference.

17. The mobile communication system according to claim 12, wherein
the control circuit in the base station is further configured:
to acquire a movement speed of the mobile communication apparatus and determines a movement distance during a communication period from the acquired movement speed;

to determine a change in the propagation path characteristics information during the communication period based on (i) the movement distance and (ii) the radio wave propagation map; and to apply compensation to a communication signal so as to reduce an influence upon communication due to the determined change in the propagation path characteristics information during the communication period.

18. The mobile communication system according to claim 1, wherein:

the target communication apparatus successively transmits a propagation path estimation signal;

the mobile communication apparatus includes a front antenna and a rear antenna and uses the front antenna as the reference antenna and the rear antenna as the selected resource antenna, the front antenna and the rear antenna each being of an identical format and longitudinally disposed in a travel direction of the mobile object;

the mobile communication apparatus further includes a different control circuit (330) configured to determine front antenna propagation path characteristics information, the front antenna propagation path characteristics information being the propagation path characteristics information obtained when the propagation path estimation signal transmitted from the target communication apparatus is received by the front antenna at a front-antenna receiving position that is a position where the propagation path estimation signal transmitted is received by the front antenna, and to transmit to the target communication apparatus a movement speed of the mobile communication apparatus and the front antenna propagation path characteristics information that are obtained when the propagation path estimation signal is received by the front antenna;

the target communication apparatus includes the control circuit acquiring the front antenna propagation path characteristics information transmitted from the mobile communication apparatus in association with a position where the front antenna propagation path characteristics information is received by a receiver in the target communication apparatus, regarding as the future communication position the front-antenna receiving position where the propagation path estimation signal is received by the front antenna in the mobile communication apparatus, and selecting a resource used in communication at the front-antenna receiving position; and the control circuit in the target communication apparatus is further configured to determine a rear communication time based on the movement speed transmitted from the mobile communication apparatus, the rear communication time being a time at which the rear antenna comes to be placed at the front-antenna receiving position where the propagation path estimation signal was communicated by the front antenna, and to communicate with the mobile communication apparatus by using the selected resource at the determined rear communication time.

19. The mobile communication system according to claim 18, wherein:

a time at which the propagation path estimation signal used by the control circuit to determine the rear communication time is transmitted from the target communication apparatus is regarded as a front communication time;

the control circuit in the target communication apparatus transmits the propagation path estimation signal at the rear communication time;

the different control circuit in the mobile communication apparatus determines rear antenna propagation path characteristics information in addition to the front antenna propagation path characteristics information, the rear antenna propagation path characteristics information being the propagation path characteristics information obtained when the propagation path estimation signal is transmitted from the target communication apparatus at the rear communication time;

the different control circuit in the mobile communication apparatus transmits (i) a current position where the propagation path estimation signal is received at the front communication time and (ii) the rear antenna propagation path characteristics information, to the target communication apparatus, in addition to the movement speed of the mobile communication apparatus and the front antenna propagation path characteristics information that are obtained when the propagation path estimation signal is received at the front-time communication time;

the control circuit in the target communication apparatus is further configured to associate a spot with a reproducibility index indicative of reproducibility of the propagation path characteristics information, and to determine, based on a comparison between the front antenna propagation path characteristics information and the rear antenna propagation path characteristics information, the reproducibility index with respect to a spot associated with the front antenna propagation path characteristics information, and updates the reproducibility index database based on the determined reproducibility index; and the control circuit in the target communication apparatus determines, based on (i) a current position received together with the front antenna propagation path characteristics information and (ii) the reproducibility index database, a parameter setting on the reliability of communication at transmitting the propagation path estimation signal at the rear communication time.

20. The mobile communication system according to claim 1, wherein:

the target communication apparatus is mounted in a first mobile object different from the mobile object using the mobile communication apparatus, the mobile object using the mobile communication apparatus being regarded as a second mobile object;

the mobile communication apparatus includes a front antenna and a rear antenna, uses the front antenna as the reference antenna and the rear antenna as the selected resource antenna, and transmits a movement speed of the second mobile object and a propagation path estimation signal from the front antenna, the front antenna and the rear antenna each being of an identical format and longitudinally disposed in a travel direction of the second mobile object;

the target communication apparatus includes the control circuit;

the target communication apparatus further includes
a target-apparatus front antenna and a target-apparatus rear antenna, the target-apparatus front antenna and the target-apparatus rear antenna each being of an identical format and longitudinally disposed in a travel direction of the first mobile object;

the control circuit in the target communication apparatus is further configured, when the target-apparatus front antenna receives the propagation path estimation signal and the movement speed at a subject time,
to regard a subject position of the front antenna of the mobile communication apparatus at a time when the propagation path estimation signal is transmitted from the mobile communication apparatus, as the future communication position,
to determine the propagation path characteristics information based on the received propagation path estimation signal, and store the determined propagation path characteristics information in a predetermined storage;

the control circuit in the target communication apparatus is further configured
to acquire the propagation path characteristics information on the future communication position from the predetermined storage,
to determine, based on the movement speed received by the target-apparatus front antenna, a time at which the rear antenna of the mobile communication apparatus comes to be placed at the subject position where the propagation path estimation signal is transmitted from the front antenna of the mobile communication apparatus, and
to communicate, at the determined time, with the rear antenna of the mobile communication apparatus by using the selected resource from either the target-apparatus front antenna or the target-apparatus rear antenna, whichever is closer to a position of the target-apparatus front antenna at the subject time of receiving the propagation path estimation signal.

21. The mobile communication system according to claim 1,
wherein:
the mobile communication apparatus includes
a plurality of antenna elements, the antenna elements each being of an identical antenna format and disposed with intervals, and
a different control circuit (330) configured
to select two antenna element groups each having antenna elements disposed in an identical pattern, the two antenna element groups including two or more of the antenna elements and being longitudinally disposed in a travel direction of the mobile object, and
to establish communication by using a front one group among the two selected antenna element groups as a front antenna acting as the reference antenna and a rear one group among the two selected antenna element group as a rear antenna acting as the reference antenna.

22. The mobile communication system according to claim 21,
wherein:
the target communication apparatus successively transmits a propagation path estimation signal;

the different control circuit in the mobile communication apparatus is further configured
to determine front antenna propagation path characteristics information with respect to each combination between (i) an antenna used by the target communication apparatus to transmit the propagation path estimation signal and (ii) the antenna elements forming the front antenna, the front antenna propagation path characteristics information being the propagation path characteristics information obtained when the propagation path estimation signal transmitted from the target communication apparatus is received by the antenna elements forming the front antenna, and
to transmit, to the target communication apparatus,
(i) a movement speed of the mobile communication apparatus at a time of reception of the propagation path estimation signal by the front antenna,
(ii) the front antenna propagation path characteristics information, and
(iii) an inter-antenna distance being a distance between corresponding antenna elements of the front antenna and the rear antenna;

the target communication apparatus includes the control circuit,
acquiring the front antenna propagation path characteristics information transmitted from the mobile communication apparatus from a receiver in the target communication apparatus in association with a reception position,
selecting a resource used in communication at a front-antenna receiving position where the propagation path estimation signal is received by the front antenna, the front-antenna receiving position being regarded as the future communication position; and the control circuit in the target communication apparatus is further configured
to determine a rear communication time based on the movement speed and the inter-antenna distance received from the mobile communication apparatus, the rear communication time being a time at which the rear antenna comes to be placed at the front-antenna receiving position where the propagation path estimation signal is received by the front antenna, and
to communicate with the mobile communication apparatus by using the selected resource at the determined rear communication time.

23. The mobile communication system according to claim 22,
wherein:
the control circuit in the target communication apparatus is further configured to transmit the propagation path estimation signal at the rear communication time;
the different control circuit in the mobile communication apparatus is further configured to determine rear antenna propagation path characteristics information with respect to each combination between (i) an antenna used by the target communication apparatus to transmit the propagation path estimation signal and (ii) the antenna elements forming the rear antenna, the rear antenna propagation path characteristics information being the propagation path characteristics information obtained when the propagation path estimation signal transmitted from the target communication apparatus at the rear communication time is received by the rear antenna;

the different control circuit in the mobile communication apparatus transmits the rear antenna propagation path characteristics information to the target communication apparatus;

the control circuit in the target communication apparatus is further configured to determine a reproducibility index indicative of reproducibility of the propagation path characteristics information on the future communication position by comparing the front antenna propagation path characteristics information and the rear antenna propagation path characteristics information with each other in respect of each corresponding combination of antenna elements of the front antenna and antenna elements of the rear antenna; and the control circuit selects a resource used in communication at the future communication position based on (i) the acquired propagation path characteristics information and (ii) the determined reproducibility index.

24. The mobile communication system according to claim 22, wherein, based on (i) a transmission cycle in which the target communication apparatus transmits a signal and (ii) the movement speed of the mobile communication apparatus that is received by the receiver of the target communication apparatus, the mobile communication apparatus allocates the antenna elements to the front antenna and the rear antenna such that the inter-antenna distance is equal to or greater than a distance moved by the mobile communication apparatus during one transmission cycle.

25. The communication apparatus according to claim 1, wherein the control circuit is configured by using at least one circuit, each of the at least one circuit being configured to be (i) a hardware circuit, or (ii) a central processing unit along with memory storing instructions, or (iii) a combination of the hardware circuit and the central processing unit.

26. The communication apparatus according to claim 3, wherein the different control circuit is configured by using at least one circuit, each of the at least one circuit being configured to be (i) a hardware circuit, or (ii) a central processing unit along with memory storing instructions, or (iii) a combination of the hardware circuit and the central processing unit.

27. A communication apparatus to communicate with a mobile communication apparatus used in a mobile object, the mobile communication apparatus having a selected resource antenna permitting communication using a selected resource, the communication apparatus comprising:

a control circuit configured to acquire propagation path characteristics information in association with a future communication position, the propagation path characteristics information being information about propagation path characteristics between the communication apparatus and a reference antenna that is equal to the selected resource antenna in antenna characteristics including at least an antenna format, the control circuit being further configured to select in advance, based on the acquired propagation path characteristics information, a resource used in communication at the future communication position between the mobile communication apparatus and the communication apparatus before the selected resource antenna of the mobile communication apparatus comes to be placed at the future communication position.

28. The communication apparatus according to claim 27, wherein the control circuit is configured by using at least one circuit, each of the at least one circuit being configured to be (i) a hardware circuit, or (ii) a central processing unit along with memory storing instructions, or (iii) a combination of the hardware circuit and the central processing unit.

* * * * *